United States Patent
Wright et al.

(10) Patent No.: US 8,127,930 B2
(45) Date of Patent: Mar. 6, 2012

(54) AMINE-ALDEHYDE RESINS AND USES THEREOF IN SEPARATION PROCESSES

(75) Inventors: James T. Wright, Atlanta, GA (US); Carl R. White, Conyers, GA (US); Kurt Gabrielson, Lilburn, GA (US); John B. Hines, Atlanta, GA (US); Lisa M. Arthur, Conyers, GA (US); Michael J. Cousin, Griffin, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 458 days.

(21) Appl. No.: 11/823,880

(22) Filed: Jun. 29, 2007

(65) Prior Publication Data

US 2008/0029460 A1 Feb. 7, 2008

Related U.S. Application Data

(63) Continuation-in-part of application No. 11/480,561, filed on Jul. 5, 2006, which is a continuation-in-part of application No. 11/298,936, filed on Dec. 12, 2005, application No. 11/823,880, which is a continuation-in-part of application No. 11/298,936.

(60) Provisional application No. 60/638,143, filed on Dec. 23, 2004, provisional application No. 60/713,340, filed on Sep. 2, 2005.

(51) Int. Cl.
*B03B 1/04* (2006.01)
*B03D 1/02* (2006.01)
*B03D 1/016* (2006.01)

(52) U.S. Cl. ............... 209/166; 209/3; 209/5; 209/9; 209/167

(58) Field of Classification Search .............. 209/3, 5, 209/9, 166, 167
See application file for complete search history.

(56) References Cited

U.S. PATENT DOCUMENTS

| | | | |
|---|---|---|---|
| 2,180,926 A * | 11/1939 | Jayne, Jr. et al. | 209/166 |
| 2,373,305 A | 4/1945 | Gieseke | |
| 2,428,752 A | 10/1947 | Hewitt | |
| 2,569,680 A | 10/1951 | Leek | |
| 2,641,584 A | 6/1953 | Martone, Jr. | |

(Continued)

FOREIGN PATENT DOCUMENTS

EP 0005390 11/1979

(Continued)

OTHER PUBLICATIONS

Aleksandrovich et al., Effect of Urea-Formaldehyde Resins on the Flotation of Potassium Ores, Khimicheskaya Promyshlennost, 1980, Moscow, Russian Federation.

(Continued)

*Primary Examiner* — Thomas M Lithgow
(74) *Attorney, Agent, or Firm* — Michael S. Kerns

(57) ABSTRACT

Amine-aldehyde resins are disclosed for removing a wide variety of solids and/or ionic species from the liquids in which they are suspended and/or dissolved. These resins are especially useful as froth flotation depressants, for example in the beneficiation of value materials (e.g., bitumen, coal, or kaolin clay) to remove impurities such as sand. The resins are also useful for treating aqueous liquid suspensions to remove solid particulates, as well as for removing metallic ions in the purification of water.

8 Claims, 1 Drawing Sheet
(1 of 1 Drawing Sheet(s) Filed in Color)

U.S. PATENT DOCUMENTS

| | | | |
|---|---|---|---|
| 2,919,802 A | | 1/1960 | Drake |
| 3,017,028 A | | 1/1962 | Schoeld et al. |
| 3,061,097 A | | 10/1962 | Dering |
| 3,224,582 A | | 12/1965 | Iannicelli |
| 3,260,365 A | * | 7/1966 | Dickson et al. ............... 209/166 |
| 3,285,849 A | | 11/1966 | Watanabe |
| 3,425,549 A | * | 2/1969 | Dickson et al. ............... 209/166 |
| 3,509,021 A | | 4/1970 | Woodward |
| 3,572,504 A | | 3/1971 | DeCuyper |
| 3,782,546 A | | 1/1974 | Kirwin et al. |
| 3,896,081 A | | 7/1975 | Baxter et al. |
| 3,929,629 A | | 12/1975 | Griffith et al. |
| 3,990,965 A | | 11/1976 | Csillag et al. |
| 4,045,385 A | | 8/1977 | Klein et al. |
| 4,078,993 A | | 3/1978 | Griffith et al. |
| 4,128,475 A | | 12/1978 | Wang et al. |
| 4,139,455 A | | 2/1979 | Griffith et al. |
| 4,155,847 A | | 5/1979 | Kawano et al. |
| 4,169,914 A | | 10/1979 | Gallacher |
| 4,208,487 A | | 6/1980 | Wang et al. |
| 4,220,525 A | | 9/1980 | Petrovich |
| 4,339,331 A | | 7/1982 | Lim et al. |
| 4,360,425 A | | 11/1982 | Lim et al. |
| 4,407,976 A | | 10/1983 | Merz et al. |
| 4,514,292 A | | 4/1985 | Burdick |
| 4,657,666 A | | 4/1987 | Snook et al. |
| 4,719,009 A | | 1/1988 | Furey et al. |
| 4,720,339 A | | 1/1988 | Nagaraj et al. |
| 4,765,823 A | | 8/1988 | Lurssen |
| 4,775,725 A | | 10/1988 | DePasquale et al. |
| 4,778,510 A | | 10/1988 | Hawkins |
| 4,783,270 A | | 11/1988 | Murao et al. |
| RE32,875 E | | 2/1989 | Kari et al. |
| 4,902,442 A | | 2/1990 | Garces |
| 4,902,764 A | | 2/1990 | Rothenberg et al. |
| 4,935,149 A | | 6/1990 | Morse |
| 4,952,329 A | | 8/1990 | Bulatovic et al. |
| 4,990,262 A | | 2/1991 | Sharpe, Jr. |
| 4,990,263 A | | 2/1991 | Sharpe, Jr. |
| 5,047,144 A | | 9/1991 | Dobias et al. |
| 5,049,612 A | | 9/1991 | Bulatovic et al. |
| 5,074,993 A | | 12/1991 | Kerr et al. |
| 5,147,528 A | | 9/1992 | Bulatovic |
| 5,362,842 A | | 11/1994 | Graves et al. |
| 5,389,716 A | | 2/1995 | Graves |
| 5,507,395 A | | 4/1996 | Wang et al. |
| 5,525,212 A | | 6/1996 | Nagari et al. |
| 5,533,626 A | | 7/1996 | Nagaraj et al. |
| 5,622,647 A | | 4/1997 | Kerr et al. |
| 5,624,569 A | | 4/1997 | Chung et al. |
| 5,674,971 A | | 10/1997 | Graves |
| 5,693,692 A | | 12/1997 | Bulatovic et al. |
| 6,114,491 A | | 9/2000 | Dupre et al. |
| 2006/0151360 A1 | | 7/2006 | Wright et al. |
| 2006/0151397 A1 | | 7/2006 | Wright et al. |
| 2007/0000839 A1 | | 1/2007 | Wright et al. |
| 2007/0012630 A1 | | 1/2007 | Wright et al. |
| 2008/0017552 A1 | | 1/2008 | Wright et al. |

FOREIGN PATENT DOCUMENTS

| | | |
|---|---|---|
| EP | 0042813 | 12/1981 |
| GB | 799873 | 8/1958 |
| GB | 1485733 | 9/1977 |
| GB | 480316 | 2/1983 |
| GB | 2154224 A | 9/1985 |
| RU | 2165798 C1 | 4/2001 |
| RU | 2169740 C1 | 6/2001 |
| SU | 276845 | 7/1970 |
| SU | 427737 | 5/1974 |
| SU | 431709 | 9/1974 |
| SU | 642000 | 1/1979 |
| SU | 724203 | 3/1980 |
| SU | 827175 A | 5/1981 |
| SU | 876171 | 10/1981 |
| WO | WO86/07072 | 12/1986 |
| WO | WO2006/071672 | 7/2006 |
| WO | WO2006/071673 | 7/2006 |
| WO | WO2007/149587 | 12/2007 |

OTHER PUBLICATIONS

International Search Report for PCT/US2008/066538, mailed Sep. 11, 2008, European Patent Office, Rijswijk, Netherlands.

PCT International Search Report and Written Opinion for PCT/US08/66534, mailed Sep. 19, 2008, 7 pages, European Patent Office, Rijswijk, Netherlands.

International Search Report for PCT/US2005/046364 which is not counterpart PCT application, but is directed to related subject matter, Nov. 2006.

International Search Report for PCT/US2005/046365 which is not counterpart PCT application, but is directed to related subject matter, Aug. 2006.

International Search Report for PCT/US2007/014713 which is not counterpart PCT application, but is directed to related subject matter, Dec. 2007.

Study of the Hydrophilizing Action of Urea-Formaldehyde Resins on Carbonate Clay Impurities in Potassium Ores, Inst. Obshch. Neorg. Khim, USSR, Vestsi Akaderni Navuk BSSR, Seryya Khimichnykh Navuk (1980).

Effect of Urea-Formaldehyde Resins on the Flotation of Potassium Ores, Khimicheskaya Promyshlennost, Moscow, Russian Federation (1977).

Adsorption of Urea-Formaldehyde Resins on Clay Minerals of Potassium Ores, Inst. Obshch Neorg.Khim., Minsk, USSR, Doklady Akademii Nauk BSSR (1974), Abstract.

Wert, E. et al., Pilot Plant Testing of Dissolved Air Flotation for Algae and Arsenic Removal, Southern Nevada Water Authority, Boulder City, NV, USA. Proceedings—Water Quality Technology Conference, p. 902-18 (2003).

CQ, Inc., Coal Cleaning Primer, found at http://www.cg-inc.com/Coal_Primer.pdf.

Chapter 5, Reagents of Laskowski, J., Coal Flotation and Fine Coal Utilization, Developments in Mineral Processing, vol. 14 (2001).

Coal Preparation (Prep) Page, found at http://66.113.204.26/mining/coalprep.htm.

Adsorption of Octadecylamine on Potassium Chloride from Clay-Salt Dispersions Modified with Urea- and Guanidine-Formaldehyde Resins, Int. Obshch. Neorg. Khim., Minsk, USSR. Vestsi Akademii Navuk BSSR, Seryya Khimichnykh Navuk (1984).

Markin, A.D., et al., Structural-Rheological Properties of Solutions of Urea- and Guanidine-Formaldehyde Resins, Vestsi Akademii Navuk BSSR, Seryya Khimichnykh Navuk (1983), vol. 5, pp. 57-60, Inst. Obshch. Neorg. Khim., Minsk, USSR.

Litvinenko, E.E., et al., Use of Wastes from Titanium Production in Flotation of Potassium Ores, Khimicheskaya Promyshlennost (Moscow, Russian Federation), 1982, vol. 5, pp. 393-395 USSR.

Markin, A.D., et al., Study of Depressing Properties of Biuret-Formaldehyde Resins in the Flotation of Potassium Ores, Vestsi Akademii Navuk BSSR, Seryya Khimichnykh Navuk, 1980, vol. 2, pp. 112-115, Inst. Obshch, Neorg. Khim., Minsk, USSR.

Aleksandrovich, Kh. M., Action of Depressor Reagents During the Selective Flotation of Potassium Salts, Obogashchenie Rud (Sankt-Peterburg, Russian Federation), 1972, vol. 17, No. 3, pp. 17-20, USSR.

Aleksandrovich, Kh. M., et al., Effect of Depressor Reagents on the Ion Composition of Salt Solutions During the Flotation of Potassium Salts, Vestsi Akademii Navuk BSSR, Seryya Khimichnykh Navuk, 1972, vol. 4, pp. 58-61, Inst. Obshch. Neorg, Khim., Minsk, USSR.

Tkachev, V.V., et al, Pollution of a Mine Atmosphere During Pumping of a Urea-Formaldehyde Resin Solution into a Coal Seam, Institute of Labor Hygiene and Professional Illnesses, Academy of Medical Sciences, USSR.

* cited by examiner

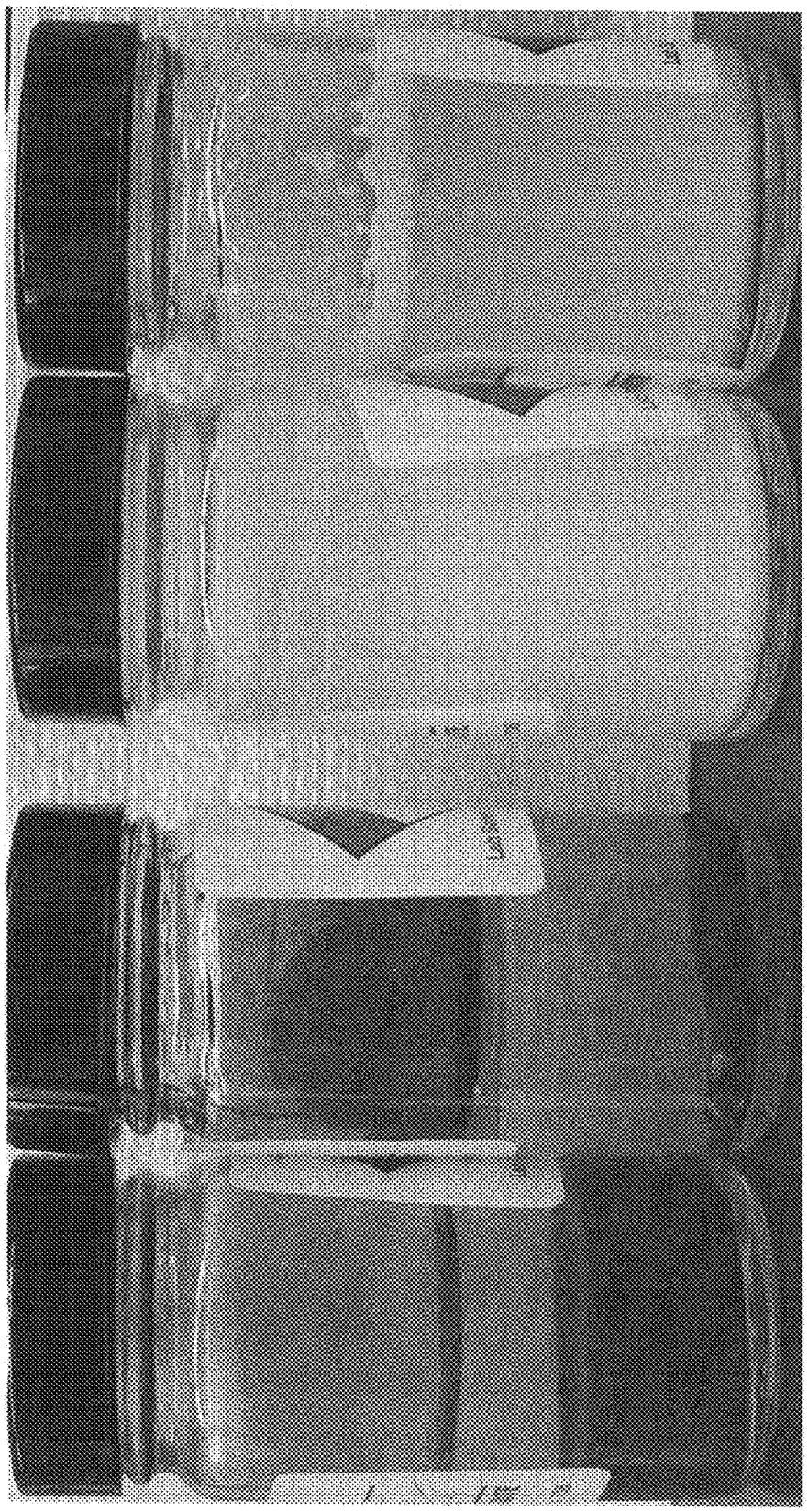

AMINE-ALDEHYDE RESINS AND USES THEREOF IN SEPARATION PROCESSES

CROSS-REFERENCE TO RELATED APPLICATIONS

This application is a continuation-in-part of U.S. application Ser. No. 11/480,561, filed Jul. 5, 2006, which is a continuation-in-part of U.S. application Ser. No. 11/298,936, filed Dec. 12, 2005, which claims the benefit of priority of U.S. Provisional Patent Application No. 60/638,143, filed Dec. 23, 2004, and 60/713,340, filed Sep. 2, 2005, each of which is hereby incorporated by reference in its entirety. This application is also a continuation-in-part of U.S. application Ser. No. 11/298,936, filed Dec. 12, 2005, which claims the benefit of priority of U.S. Provisional Patent Application No. 60/638,143, filed Dec. 23, 2004, and 60/713,340, filed Sep. 2, 2005, each of which is hereby incorporated by reference in its entirety.

FIELD OF THE INVENTION

The present invention relates to resins for use in separation processes, and especially the selective separation of solids and/or ionic species such as metallic cations from aqueous media. Such processes include froth flotation (e.g., used in the purification of clay-containing ores), the separation of drill cuttings from oil drilling fluids, clay and coal slurry dewatering, sewage treatment, pulp and paper mill effluent processing, the removal of sand from bitumen, and the purification of water to render it potable. The resins comprise the reaction product of a primary or secondary amine and an aldehyde (e.g., a urea-formaldehyde resin).

BACKGROUND OF THE INVENTION

Froth Flotation

Industrially, processes for the purification of liquid suspensions or dispersions (and especially aqueous suspensions or dispersions) to remove suspended solid particles are quite prevalent. Froth flotation, for example, is a separation process based on differences in the tendency of various materials to associate with rising air bubbles. Additives are often incorporated into the froth flotation liquid (e.g., aqueous brine) to improve the selectivity of the process. For example, "collectors" can be used to chemically and/or physically absorb onto mineral(s) to be floated, rendering them more hydrophobic. On the other hand, "depressants," typically used in conjunction with collectors, render other materials (e.g., gangue minerals) less likely to associate with the air bubbles, and therefore less likely to be carried into the froth concentrate.

In this manner, some materials (e.g., value minerals) will, relative to others (e.g., gangue materials), exhibit preferential affinity for air bubbles, causing them to rise to the surface of the aqueous slurry, where they can be collected in a froth concentrate. A degree of separation is thereby effected. In less common, so-called reverse froth flotations, it is the gangue that is preferentially floated and concentrated at the surface, with the desired materials removed in the bottoms. Gangue materials typically refer to quartz, sand and clay silicates, and calcite, although other minerals (e.g., fluorite, barite, etc.,) may be included. In some cases, the material to be purified (i.e., the desired material) actually comprises predominantly such materials, and the smaller amounts of contaminants are preferentially floated. For example, in the beneficiation of kaolin clay, a material having a number of industrially significant applications, iron and titanium oxides can be separated by flotation (into a froth concentrate) from the impure, clay-containing ore, leaving a purified kaolin clay bottoms product.

The manner in which known collectors and depressants achieve their effect is not understood with complete certainty, and several theories have been proposed to date. Depressants, for example may prevent the gangue minerals from adhering to the value materials to be separated, or they may even prevent the collector(s) from absorbing onto the gangue minerals. Whatever the mechanism, the ability of a depressant to improve the selectivity in a froth flotation process can very favorably impact its economics.

Overall, froth flotation is practiced in the beneficiation of a wide variety of value materials (e.g., mineral and metal ores and even high molecular weight hydrocarbons such as bitumen), in order to separate them from unwanted contaminants which are unavoidably co-extracted from natural deposits. A particular froth flotation process of commercial significance involves the separation of bitumen from sand and/or clay, which are ubiquitous in oil sand deposits, such as those found in the vast Athabasca region of Alberta, Canada. Bitumen is recognized as a valuable source of "semi-solid" petroleum or heavy hydrocarbon-containing crude oil, which can be upgraded into many valuable end products including transportation fuels such as gasoline or even petrochemicals. Alberta's oil sand deposits are estimated to contain 1.7 trillion barrels of bitumen-containing crude oil, exceeding the reserves in all of Saudi Arabia. For this reason, significant effort has been recently expended in developing economically feasible operations for bitumen recovery, predominantly based on subjecting an aqueous slurry of extracted oil sand to froth flotation. For example, the "Clark Process" involves recovering the bitumen in a froth concentrate while depressing the sand and other solid impurities.

Various gangue depressants for improving froth flotation separations are known in the art and include sodium silicate, starch, tannins, dextrins, lignosulphonic acids, carboxyl methyl cellulose, cyanide salts and many others. More recently certain synthetic polymers have been found advantageous in particular beneficiation processes using froth flotation. For example, U.S. Pat. No. Re. 32,875 describes the separation of gangue from phosphate minerals (e.g., apatite) using as a depressant a phenol-formaldehyde copolymer (e.g., a resol, a novolak) or a modified phenol polymer (e.g., a melamine-modified novolak).

U.S. Pat. No. 3,990,965 describes the separation of iron oxide from bauxite using as a depressant a water soluble prepolymer of low chain length that adheres selectively to gangue and that can be further polymerized to obtain a crosslinked, insoluble resin.

U.S. Pat. No. 4,078,993 describes the separation of sulfide or oxidized sulfide ores (e.g., pyrite, pyrrhotite, or sphalerite) from metal mineral ores (e.g., copper, zinc, lead, nickel) using as a depressant a solution or dispersion of a low molecular weight condensation product of an aldehyde with a compound containing 2-6 amine or amide groups.

U.S. Pat. Nos. 4,128,475 and 4,208,487 describe the separation of gangue materials from mineral ore using a conventional frothing agent (e.g., pine oils) combined with a (preferably alkylated) amino-aldehyde resin that may have free methylol groups.

U.S. Pat. No. 4,139,455 describes the separation of sulfide or oxidized sulfide ores (e.g., pyrite, pyrrhotite, or sphalerite) from metal mineral ores (e.g., copper, zinc, lead, nickel) using as a depressant an amine compound (e.g., a polyamine) in which at least 20% of the total number of amine groups are tertiary amine groups and in which the number of quaternary amine groups is from 0 to not more than ⅓ the number of tertiary amine groups.

U.S. Pat. No. 5,047,144 describes the separation of siliceous materials (e.g., feldspar) from minerals (e.g., kaolinite) using as a depressant a cation-active condensation product of aminoplast formers with formaldehyde, in combination with cation-active tensides (e.g., organic alkylamines) or anion-active tensides (e.g., long-chained alkyl sulfonates).

Russian Patent Nos. 427,737 and 276,845 describe the depression of clay slime using carboxymethyl cellulose and urea-formaldehyde resins, optionally combined with methacrylic acid-methacrylamide copolymers or starch ('845 patent).

Russian Patent Nos. 2,169,740; 2,165,798; and 724,203 describe the depression of clay carbonate slimes from ores in the potassium industry, including sylvinite (KCl—NaCl) ores. The depressant used is a urea/formaldehyde condensation product that is modified by polyethylenepolyamine. Otherwise, a guanidine-formaldehyde resin is employed ('203 patent).

Markin, A. D., et. al., describe the use of urea-formaldehyde resins as carbonate clay depressors in the flotation of potassium ores. *Study of the Hydrophilizing Action of Urea-Formaldehyde Resins on Carbonate Clay Impurities in Potassium Ores*, Inst. Obshch. Neorg. Khim, USSR, Vestsi Akademii Navuk BSSR, Seryya Khimichnykh Navuk (1980); *Effect of Urea-Formaldehyde Resins on the Flotation of Potassium Ores*, Khimicheskaya Promyshlennost, Moscow, Russian Federation (1980); and *Adsorption of Urea-Formaldehyde Resins on Clay Minerals of Potassium Ores*, Inst. Obshch Neorg. Khim., Minsk, USSR, Doklady Akademii Nauk BSSR (1974).

As is recognized in the art, a great diversity of materials can be subject to beneficiation/refinement by froth flotation. Likewise, the nature of both the desired and the unwanted components varies greatly. This is due to the differences in chemical composition of these materials, as well as in the types of prior chemical treatment and processing steps used. Consequently, the number and type of froth flotation depressants is correspondingly wide.

Also, the use of a given depressant in one service (e.g., raw potassium ore beneficiation) is not a predictor of its utility in an application involving a significantly different feedstock (e.g., bitumen-containing oil sand). This also applies to any expectation regarding the use of a depressant that is effective in froth flotation, in the any of the separations of solid contaminants from aqueous liquid suspensions, as described below (and vice versa). The theoretical mechanisms by which froth flotation and aqueous liquid/solid separations occur are significantly different, where the former process relies on differences in hydrophobicity and the latter on several other possibilities (charge destabilization/neutralization, agglomeration, host-guest theory (including podands), hard-soft acid base theory, dipole-dipole interactions, Highest Occupied Molecular Orbital-Lowest unoccupied Molecular Orbital (HOMO-LUMO) interactions, hydrogen bonding, Gibbs free energy of bonding, etc). Traditional depressants in froth flotation for the benefication of metallic ores, such as guar gum, are not employed as dewatering agents, or even as depressants in froth flotation for bitumen separation. Moreover, in two of the applications described below (waste clay and coal dewatering), no agents are currently used to improve the solid/liquid separation. Overall, despite the large offering of flotation depressants and dewatering agents in the art, an adequate degree of refinement in many cases remains difficult to achieve. There is therefore a need in the art for agents which can be effectively employed in a wide range of separation processes, including both froth flotation and the separation of solid contaminants from liquid suspensions.

Other Separations

Other processes, in addition to froth flotation, for the separation of solid contaminants from liquid suspensions can involve the use of additives that either destabilize these suspensions or otherwise bind the contaminants into larger agglomerates. Coagulation, for example, refers to the destabilization of suspended solid particles by neutralizing the electric charge that separates them. Flocculation refers to the bridging or agglomeration of solid particles together into clumps or flocs, thereby facilitating their separation by settling or flotation, depending on the density of the flocs relative to the liquid. Otherwise, filtration may be employed as a means to separate the larger flocs.

The additives described above, and especially flocculants, are often employed, for example, in the separation of solid particles of rock or drill cuttings from oil and gas well drilling fluids. These drilling fluids (often referred to as "drilling muds") are important in the drilling process for several reasons, including cooling and lubricating the drill bit, establishing a fluid counterpressure to prevent high-pressure oil, gas, and/or water formation fluids from entering the well prematurely, and hindering the collapse of the uncased wellbore. Drilling muds, whether water- or oil-based, also remove drill cuttings from the drilling area and transport them to the surface. Flocculants such as acrylic polymers are commonly used to agglomerate these cuttings at the surface of the circulating drilling mud, where they can be separated from the drilling mud.

Other uses for flocculants in solid/liquid separations include the agglomeration of clays which are suspended in the large waste slurry effluents from phosphate production facilities. Flocculants such as anionic natural or synthetic polymers, which may be combined with a fibrous material such as recycled newspaper, are often used for this purpose. The aqueous clay slurries formed in phosphate purification plants typically have a flow rate of over 100,000 gallons per minute and generally contain less than 5% solids by weight. The dewatering (e.g., by settling or filtration) of this waste clay, which allows for recycle of the water, presents one of the most difficult problems associated with reclamation. The settling ponds used for this dewatering normally make up about half of the mined area, and dewatering time can be on the order of several months to several years.

In the separation of solids from aqueous liquids, other specific applications of industrial importance include the filtration of coal from water-containing slurries (i.e., slurry dewatering), the treatment of sewage to remove contaminants (e.g., sludge) via sedimentation, and the processing of pulp and paper mill effluents to remove suspended cellulosic solids. The dewatering of coal poses a significant problem industrially, as the BTU value of coal decreases with increasing water content. Raw sewage, both industrial and municipal, requires enormous treatment capacity, as wastes generated by the U.S. population, for example, are collected into sewer systems and carried along by approximately 14 billion gallons of water per day. Paper industry effluent streams likewise represent large volumes of solid-containing aqueous liquids, as waste water generated from a typical paper plant often exceeds 25 million gallons per day. The removal of sand from aqueous bitumen-containing slurries generated in the extraction and subsequent processing of oil sands, as described previously, poses another commercially significant challenge in the purification of aqueous liquid suspensions. Also, the removal of suspended solid particulates is often an important consideration in the purification of water, such as in the preparation of drinking (i.e., potable) water. Synthetic polyacrylamides, as well as naturally-occurring hydrocolloidal polysaccharides such as alginates (copolymers of D-mannuronic and L-guluronic acids) and guar gum are flocculants in this service.

The above applications therefore provide several specific examples relating to the treatment of aqueous liquid suspensions to remove solid particulates. However, such separations are common in a vast number of other processes in the mineral, chemical, industrial and municipal waste, sewage treatment, and paper industries, as well as in a wide variety of other water-consuming industries. Thus, there is a need in the art for additives that can effectively promote selective separation of a variety of solid contaminants from liquid suspensions. Advantageously, such agents should be selective in chemically interacting with the solid contaminants, through coagulation, flocculation, or other mechanisms such that the removal of these contaminants is easily effected. Especially desirable are additives that are also able to complex unwanted ionic species such as metal cations to facilitate their removal as well.

SUMMARY OF THE INVENTION

All Uses

Aspects of the present invention are described in U.S. Pat. Nos. 5,362,842, 5,389,716, 5,674,971, and 6,114,491, each of which is hereby incorporated by reference in its entirety.

The present invention is directed to amine-aldehyde resins for removing, generally in a selective fashion, a variety of solids and/or ionic species from the liquids in which they are suspended and/or dissolved. These resins are highly versatile, as they are especially useful as froth flotation depressants in the separation of bitumen from sand and/or clay or in the purification of clay (e.g., kaolin clay) from a clay-containing ore. The amine-aldehyde resins are also useful for treating aqueous liquid suspensions (e.g., aqueous suspensions containing sand, clay, coal, and/or other solids, such as used drill cutting fluids, as well as process and effluent streams in phosphate and coal production, sewage treatment, paper manufacturing, or bitumen recovery facilities) to remove solid particulates and also potentially metallic cations (e.g., in the purification of drinking water).

Froth Flotation

Without being bound by theory, the amine-aldehyde resins of the present invention are highly selective in froth flotation processes, including those for (1) binding to sand and/or clay to purify bitumen and (2) refining clay-containing ores, as well as those for a number of value mineral or metal refinement or beneficiation processes, such as the beneficiation of coal ore or synthetic gypsum. Also, because these resins have affinity for water, sand, clay, and/or ash particles, which interact and associate with the resin, are effectively sequestered in the aqueous phase in froth flotation. Consequently, sand, clay, ash, and/or other contaminants such as gangue materials can be selectively separated from value materials (e.g., minerals, metals, or bitumen). Otherwise, clay can be beneficiated using froth flotation to remove, from clay-containing ores, impurities such as iron oxides.

Accordingly, in one embodiment, the present invention is a method for purifying bitumen from a bitumen-containing slurry comprising sand or clay. The method comprises treating the slurry with a depressant comprising a resin that is the reaction product of a primary or a secondary amine and an aldehyde and recovering, by froth flotation either after or during the treating step, purified bitumen having a reduced amount of sand or clay. In another embodiment, the resin is a urea-formaldehyde resin, which is typically the reaction product of urea and formaldehyde at a formaldehyde:urea (F:U) molar ratio from about 1.75:1 to about 3:1. In another embodiment, the depressant comprises a resin in a solution or dispersion having a resin solids content from about 30% to about 90% by weight.

In another embodiment, the present invention is a method for purifying clay from a clay-containing ore comprising an impurity selected from a metal, a metal oxide, a mineral, and mixtures thereof. The method comprises treating a slurry of the clay-containing ore with a depressant comprising a resin and recovering, by froth flotation of the impurity either after or during the treating step, a purified clay having a reduced amount at least one of the impurities. The resin is the reaction product of a primary or a secondary amine and an aldehyde (i.e., an amine-aldehyde resin). In another embodiment, the clay-containing ore comprises kaolin clay. In another embodiment, the impurity comprises a mixture of iron oxide and titanium dioxide. In another embodiment, the impurity comprises coal.

In another embodiment, the present invention is a method for beneficiation of an ore. The method comprises treating a slurry of ore particles with a depressant comprising an amine-aldehyde resin. The ore slurry treatment may occur before or during froth flotation. In another embodiment, when ore slurry treatment occurs before froth flotation, the treating step comprises combining the slurry of the ore and the depressant, followed by froth flotation of the slurry of the ore and depressant. In another embodiment, the treating step further comprises, after the combining step and prior to froth flotation, conditioning the slurry. The conditioning step may be carried out in a conditioning vessel for a conditioning time from about 30 seconds to about 10 minutes, at a conditioning temperature from about 1° C. to about 95° C., and at a conditioning pH of at least about 2.0. In another embodiment, the beneficiation method purifies and recovers, from the ore, a value mineral or metal selected from the group consisting of phosphate, potash, lime, sulfate, gypsum, iron, platinum, gold, palladium, titanium, molybdenum, copper, uranium, chromium, tungsten, manganese, magnesium, lead, zinc, clay, coal, silver, graphite, nickel, bauxite, borax, and borate. In another embodiment, the ore comprises an impurity selected from the group consisting of sand, clay, an iron oxide, a titanium oxide, iron-bearing titania, mica, ilmenite, tourmaline, an aluminum silicate, calcite, dolomite, anhydrite, ferromagnesian, feldspar, calcium magnesium carbonate, igneous rock, soil, and mixtures thereof. Often, the impurities are sand or clay impurities, as are typically extracted with phosphate or potassium ores. In another embodiment, however, mercury is an impurity of an ore comprising coal or synthetic gypsum, which is treated with the amine-aldehyde resin prior to or during a froth flotation step. The coal or synthetic gypsum has an initial amount of total mercury and the beneficiation purifies and recovers, from the ore, purified coal or purified synthetic gypsum having a final amount of total mercury that is less than the initial amount of total mercury, wherein the initial and final amounts of total mercury are measured on a volatile free basis. In another embodiment, the final amount of total mercury is less than about 10 ppb on a volatile free basis. In another embodiment, the synthetic gypsum is formed during desulfurization of flue gas from a coal-burning power plant. In another embodiment, the depressant comprises the amine-aldehyde resin and a chelating agent. In another embodiment, the ore comprises an impure coal ore, the treating step is prior to or during a froth flotation step, and the beneficiation purifies and recovers, from the impure coal ore, purified coal having, relative to the impure coal ore, a reduced amount of an impurity selected from the group consisting of nitrogen, sulfur, silicon, ash, and pyrite, wherein the impurity is measured on a volatile free weight basis. In another embodiment, the ore comprises an impure coal ore, the treating step is prior to or during a froth flotation step, and the beneficiation purifies and recovers, from the impure coal ore, purified coal having, relative to the impure coal ore, a reduced amount of moisture and/or an increased BTU value per unit weight.

Other Separations

In another embodiment, the present invention is a method for purifying an aqueous liquid suspension comprising a solid contaminant. The method comprises treating the liquid suspension with a resin as described above and removing, either after or during the treating step, (1) at least a portion of the solid contaminant in a contaminant-rich fraction and/or (2) a purified liquid. In another embodiment, the treating step comprises flocculating the solid contaminant (e.g., sand or clay). In another embodiment, the removing step is carried out by sedimentation, flotation, or filtration. In another embodiment, the liquid suspension is an oil well drilling fluid and the method comprises removing a purified drilling fluid for reuse in oil well drilling. In another embodiment, the aqueous liquid suspension is a clay-containing effluent slurry from a phosphate production facility and the method comprises removing purified water for reuse in phosphate production. In another embodiment, the aqueous liquid suspension is an aqueous coal-containing suspension and the method comprises removing a coal-rich fraction by filtration. In another embodiment, the aqueous liquid suspension comprises sewage and the method comprises removing purified water by sedimentation. In another embodiment, the aqueous liquid suspension comprises a pulp or paper mill effluent, the solid contaminant comprises a cellulosic material, and the method comprises removing purified water. In another embodiment, the aqueous liquid suspension is a bitumen production process intermediate or effluent slurry comprising sand or clay. In still another embodiment, the purified liquid is potable water.

In another embodiment, the present invention is a method for purifying coal ore. The method comprises treating an aqueous slurry of the coal ore with a depressant prior to or during a size or density classification operation which recovers purified coal having, relative to the coal ore, a reduced amount of an impurity selected from the group consisting of mercury, nitrogen, sulfur, silicon, ash, and pyrite, wherein the impurity is measured on a volatile free basis. The depressant comprises an amine-aldehyde resin as described herein. In another embodiment, the purified coal has, relative to the coal ore, a reduced amount of moisture and/or an increased BTU value per unit weight. In another embodiment, the purified coal has, relative to the coal ore, a reduced amount of all impurities selected from the group consisting of mercury, nitrogen, sulfur, silicon, ash, and pyrite. In another embodiment, the reduced amount is less than an amount in a purified reference coal recovered in the size classification operation, but without treating the aqueous slurry with the depressant. In another embodiment, the size or density classification operation is selected from the group consisting of a cyclone separation, a heavy medium separation, filtration, screening, and combinations thereof.

In another embodiment, the present invention is a method for purifying water comprising a metallic cation. The method comprises treating the water with the resin described above and removing at least a portion of the metallic cation by filtration to yield purified water (e.g., potable water). In another embodiment, the removing step comprises membrane filtration. In another embodiment, the metallic cation is selected from the group consisting of $As^{+5}$, $Pb^{+2}$, $Cd^{+2}$, $Cu^{+2}$, $Mn^{+2}$, $Hg^{+2}$, $Zn^{+2}$, $Fe^{+2}$, and mixtures thereof. In yet another embodiment, the resin is modified with an anionic functional group.

These and other embodiments are apparent from the following Detailed Description.

BRIEF DESCRIPTION OF THE DRAWING

The patent or patent application file contains at least one drawing executed in color. Copies of this patent application publication with color drawing(s) will be provided by the Office upon request and payment of the necessary fee.

FIG. 1 is a photograph of four jars containing graphite (two left jars) and bentonite (two right jars) that were left to stand for 24 hours after vigorous shaking to suspend these solids in water. The leftmost jar and the third jar from the left were treated with Urea-Formaldehyde resin prior to shaking.

DETAILED DESCRIPTION OF THE INVENTION

All Uses

The resin that is used in separation processes of the present invention is the reaction product of a primary or secondary amine and an aldehyde. The primary or secondary amine, by virtue of having a nitrogen atom that is not completely substituted (i.e., that is not part of a tertiary or quaternary amine) is capable of reacting with an aldehyde, to form an adduct. If formaldehyde is used as the aldehyde, for example, the adduct is a methylolated adduct having reactive methylol functionalities. For purposes of the present invention, representative primary and secondary amines used to form the resin include compounds having at least two functional amine or amide groups, or amidine compounds having at least one of each of these groups. Such compounds include ureas, guanidines, and melamines, which may be substituted at their respective amine nitrogen atoms with aliphatic or aromatic radicals, wherein at least two nitrogen atoms are not completely substituted. Often, the primary amines are used. Urea is representative of these, due to its low cost and extensive commercial availability. In the case of urea, if desired, at least a portion thereof can be replaced with ammonia, primary alkylamines, alkanolamines, polyamines (e.g., alkyl primary diamines such as ethylene diamine and alkyl primary triamines such as diethylene triamine), polyalkanolamines, melamine or other amine-substituted triazines, dicyandiamide, substituted or cyclic ureas (e.g., ethylene urea), primary amines, secondary amines and alkylamines, tertiary amines and alkylamines, guanidine, and guanidine derivatives (e.g., cyanoguanidine and acetoguanidine). Aluminum sulfate, cyclic phosphates and cyclic phosphate esters, formic acid or other organic acids may also be used in conjunction with urea. The amount of any one of these components (or if used in combination then their combined amount), if incorporated into the resin to replace part of the urea, typically will vary from about 0.05 to about 20% by weight of the resin solids. These types of agents promote hydrolysis resistance, flexibility, reduced aldehyde emissions and other characteristics, as is appreciated by those having skill in the art.

The aldehyde used to react with the primary or secondary amine as described above, to form the resin, may be formaldehyde, or other aliphatic aldehydes such as acetaldehyde and propionaldehyde. Aldehydes also include aromatic aldehydes (e.g., benzylaldehyde and furfural), and other aldehydes such as aldol, glyoxal, and crotonaldehyde. Mixtures of aldehydes may also be used. Generally, due to its commercial availability and relatively low cost, formaldehyde is used.

In forming the resin, the initial formation of an adduct between the amine and the aldehyde is well known in the art. The rate of the aldehyde addition reaction is generally highly dependent on pH and the degree of substitution achieved. For example, the rate of addition of formaldehyde to urea to form successively one, two, and three methylol groups has been estimated to be in the ratio of 9:3:1, while tetramethylolurea is normally not produced in a significant quantity. The adduct formation reaction typically proceeds at a favorable rate under alkaline conditions and thus in the presence of a suitable alkaline catalyst (e.g., ammonia, alkali metal hydroxides, or alkaline earth metal hydroxides). Sodium hydroxide is most widely used.

At sufficiently high pH values, it is possible for the adduct formation reaction to proceed essentially in the absence of condensation reactions that increase the resin molecular weight by polymerization (i.e., that advance the resin). However, for the formation of low molecular weight condensate resins from the further reaction of the amine-aldehyde adduct, the reaction mixture is generally maintained at a pH typically from about 5 to about 9. If desired, an acid such as acetic acid can be added to help control the pH and therefore the rate of condensation and ultimately the molecular weight of the condensed resin. The reaction temperature is normally in the range from about 30° C. to about 120° C., typically less than about 85° C., and often the reflux temperature is used. A reaction time from about from about 15 minutes to about 3 hours, and typically from about 30 minutes to about 2 hours, is used in preparing the low molecular weight amine-aldehyde condensate resin from the primary or secondary amine and aldehyde starting materials. Various additives may be incorporated, prior to or during the condensation reaction, in order to impart desired properties into the amine-aldehyde resin. For example, guar gum; carboxymethylcellulose or other polysaccharides such as alginates; or polyols such as polyvinyl alcohols, pentaerythitol, or Jeffol™ polyols (Hunstman Corporation, Salt Lake City, Utah, USA) may be used to alter the viscosity and consistency of the final amine-aldehyde resin and improve its performance in froth flotation and other applications. Otherwise, quaternary ammonium salts including diallyl dimethyl ammonium chloride (or analogs such as diallyl diethyl ammonium chloride) or alkylating agents including epichlorohydrin (or analogs such as epibromohydrin) may be used to increase the cationic charge of the amine-aldehyde resin and thereby improve its performance in certain solid/liquid separations (e.g., clay dewatering) discussed below. In this manner, such additives may be more effectively reacted into the amine-aldehyde resin than merely blended with the resin after its preparation.

In one aspect of this invention, the following example of a base urea-formaldehyde resin is provided. In the first reaction step, formaldehyde (F), urea (U), triethanolamine (TEA) and optionally ammonia are charged into a reaction vessel. The reactants can be introduced into the reactor in any convenient manner or order. The quantity of each reactant added to the reactor is that quantity sufficient to achieve molar F/U/TEA/ammonia ratios in the range (1.50:4.0):1:(0.001-0.1):(0.0-0.5). Each reactant can be introduced in one charge or in a plurality of charges. It is preferred that the quantities of each reactant be sufficient to maintain a F/U/TEA/ammonia molar ratio within the range of (1.50-4.0):1:(0.001-0.1):(0.0-0.5) during the first reaction step. This invention relates to resin compositions comprising functionalized unsaturated polyesters which are low-temperature curable, coating compositions comprising the resins, and methods of making the same.

The pH of the reactant mixture is maintained above about 7, preferably above about 8, measured at the reaction temperature at the beginning of the reaction. During the course of the first reaction step, the pH typically stays above about 7. The alkaline reaction mixture is heated to a temperature of at least about 70° C., preferably above about 80° C., most preferably to a temperature of about 95° C. Generally, the reaction mixture is heated to a temperature of about 95° C. over a period of about 30 minutes. The reaction mixture is held at the elevated temperature for a time sufficient to ensure complete methylolation of the urea in a controlled time frame. Generally, 15 to 20 minutes at about 95° C. is sufficient.

In the second reaction step, a mineral or organic acid is added to the reaction mixture in a quantity sufficient to achieve an acidic pH condition in the reactant mass, a pH of about 5 being preferred. The acid can be added in a single charge, or in a plurality of charges. Reaction then is continued under this acid condition at an elevated temperature, typically above about 75° C., for a time sufficient to reduce free formaldehyde to less than 2%, preferably less than 1%, generally for about 45 to 240 minutes, preferably for about 90 to 120 minutes. A reaction temperature of about 95° C. for about two hours is suitable. Depending on the initial F:U molar ratio, further urea additions and reaction periods are repeated until the F/U mole ratio is reduced to between about 1.5:1 and 2.5:1. It is important to maintain the pH at about 5 at the time of any such additional urea additions to obtain desired resin properties. For example, after the initial second reaction step, the reaction mixture is then cooled, for example, to about 80° C. and additional urea is added and reaction is continued for about one additional hour. A plurality of urea addition/reaction steps can be utilized until the desired final F/U mole ratio is reached.

Additional triethanolamine then can be added, if desired. The resin then is cooled to ambient conditions and can be neutralized, for example, by the addition of sodium hydroxide to quench the reaction.

Skilled practitioners recognize that the reactants are commercially available in many forms. Any form which can react with the other reactants and which does not introduce extraneous moieties deleterious to the desired reaction and reaction product can be used in the preparation of the urea-formaldehyde resin of the invention.

Formaldehyde is available in many forms. Paraform (solid, polymerized formaldehyde) and formalin solutions (aqueous solutions of formaldehyde, often with methanol, in 37 percent, 44 percent, or 50 percent formaldehyde concentration) are commonly used forms. Formaldehyde also is available as a gas. Any of these forms is suitable for use in the practice of the invention. Typically, formalin solutions are preferred as the formaldehyde source.

Similarly, urea is available in many forms. Solid urea, such as prill, and urea solutions, typically aqueous solutions, are commonly available. Further, urea may be combined with another moiety, most typically formaldehyde and urea-formaldehyde, often in aqueous solution. Any form of urea or urea in combination with formaldehyde is suitable for use in the practice of the invention. Both urea prill and combined urea-formaldehyde products are preferred, such as Urea Formaldehyde Concentrate or UFC 85. These types of products are disclosed in, for example, U.S. Pat. Nos. 5,362,842 and 5,389,716.

TEA typically is supplied as a liquid, often combined with diethanolamine and monoethanolamine. Although any form of TEA is suitable for use in the claimed method and product, it is preferred to use TEA products having only minimal diethanolamine and monoethanolamine contaminants. Preferably, the TEA weight concentration is at least about 10 times the sum of the diethanolamine and monoethanolamine weight concentrations, and more preferably is about 20 times that sum.

Skilled practitioners also recognize that ammonia is available in various gaseous and liquid forms, particularly including aqueous solutions at various concentrations. Any of these forms is suitable for use. However, commercially-available aqueous ammonia-containing solutions are preferred herein. Such solutions typically contain between about 10 and 35 percent ammonia. A solution having 35% ammonia can be used providing stability and control problems can be overcome. An aqueous solution containing about 28 percent ammonia is particularly preferred. Anhydrous ammonia may also be used.

Use of ammonia and/or late additions of urea are commonly used prior art techniques to reduce free formaldehyde levels in urea-formaldehyde polymer systems. The former technique suffers from reducing the cured polymers resistance to hydrolysis. The latter technique suffers from a tendency to produce a polymer system that releases smoke during the cure cycle. This invention suffers from neither of these problems, but significantly reduces free formaldehyde levels during cure and in the cured product.

The use of a scavenger changes the state of the formaldehyde from free formaldehyde to a pH unstable monomer that decomposes with time under acidic conditions to release formaldehyde. It has been discovered that the polymer of the present invention is more pH stable and releases significantly less formaldehyde than a polymer synthesized without the presence of the minor modifying amount of triethanolamine when exposed to acidic environments. This attribute makes the resin particularly useful as a binder for metal salts, particularly metal acid salts, in the preparation of briquettes for use in deodorizing animal sewage, since such products are exposed to acidic hydrogen sulfide emanating from waste materials.

In one aspect of the invention, a quantity of urea and formaldehyde and, if desired, fresh water, in an amount to provide an initial formaldehyde to urea molar ratio of between about 1.50 and 4.0, preferably 2.75 to 4.0, are charged into a stainless steel reactor equipped with agitator. TEA then is added in a minor amount to provide a TEA to urea mole ratio of between 0.001:1 to 0.10:1, the reactants mixed and pH recorded. The pH preferably should be between about 8.0 and about 8.4. more preferably about 8.2.

In the preferred practice of the invention, ammonium hydroxide is then charged into the reactor in an amount to provide an ammonia to urea ratio of about 0.2:1.0 to 0.5:1.0. The ammonium hydroxide is added as quickly as possible, preferably in 25 minutes or less.

Under normal conditions, the addition of the ammonium hydroxide will cause the temperature of the reactant mass to exotherm to 70°-75° C. The temperature is then maintained at a minimum temperature of 75° C. and held at 75-80° C. for a minimum of 5 minutes. During this 5 minute hold, the pH is checked. A pH of between about 7.8 and 8.5 is desirable. If the solution is above 8.5, it is adjusted downwardly to the desired range with 7.0% sulfuric acid.

The temperature is then cooled to below about 70° C., preferably below about 45° C. With the temperature at or below 50° C., the urea is added as rapidly as possible to bring the reactant mixture within the aforementioned molar ratio range. The addition of urea will cause the reaction mixture to endotherm and assist in this cooling.

Starting at about 40° C., the reaction mixture is heated to about 95° C. over the course of 30 minutes. The exotherm of the reaction will assist in the upheat. Heating can be controlled with vacuum and/or with cooling coils. During the upheat cycle the pH will drop. It is very important that pH be monitored at least every 10 minutes during the upheat cycle. The reaction mixture is held at 95° C. for 15 to 20 minutes during which time the pH should level off to between about 6.8 and 7.3. If the pH drops too low, the pH during the acid condensation step will be lower and the resin will advance more rapidly. In order to control resin advancement, the pH can be raised by the addition of alkaline or, alternatively, reaction temperature can be decreased.

A 7.0% sulfuric acid solution thereafter is added over a 10 minute period. Addition of sulfuric acid must be made beneath the resin surface in an area of mixing such that dispersion is very rapid and no gelled particles are formed. Over the next hour, the pH of the reactant mass will drop to about 4.9 to about 5.2. If the pH is allowed to level off above 5.2, resin advancement will be retarded. Thus, additional small amounts of 7.0% sulfuric acid may be needed to bring the pH into the desired 4.9 to 5.2 range. Caution, however, must be used if the pH drops below 4.9, since the rate of resin enhancement will increase rapidly as the pH is lowered. If the pH drops below 4.9, aqueous 25-50% sodium hydroxide can be used to raise the pH into the 4.9-5.2 range or the temperature can be lowered, for example, to 90° C. or lower, to maintain control of resin advancement. Upon reaching the desired viscosity, the reactants are cooled to 80° C., which will slow the rate of viscosity advancement. More urea then is added to reduce the cumulative F:U mole ratio to the desired level and the reactant mass is reacted for 40-60 minutes at 80° C. to maintain an adequate advancement rate. If the rate of advancement slows, the temperature should be increased. It is not necessary, or even desirably, to add more acid to lower the pH. At this stage, only temperature generally should be used to control the rate of advancement. An increase of 5° C. will double the rate of advancement. A decrease of 5° C. will cut the rate of advancement. The temperature, however, normally should not be allowed to drop below 78° C. during resin advancement.

It is to be understood that a single urea addition in the second reaction stage, as illustrated herein, may be sufficient to obtain the desired mole ratio and resin properties. Two, three or even four or more loads of urea may, however also be used. The number of urea additions, and the amount of urea added, will depend on the desired resin properties, including formaldehyde to urea mole ratio, viscosity, desired solubility and cure rate, and will be readily determinable by one skilled in the art using routine experimentation within the parameters taught herein. Additional charges of TEA can also be used. Additional modifiers, such as melamine, ethylene ureas and dyaniamide can also be incorporated into the resin of the invention. Further urea additions for purposes of scavenging formaldehyde or as a diluent also may be used.

A further aspect of this invention is based on the discovery that a prepolymer formed by a first step reaction of formaldehyde, urea, and ammonia can be converted to a crosslinked polymer matrix that exhibits improved control of formaldehyde emissions and a faster rate of cure than similar polymers made using conventional methods. The polymer is prepared by reacting urea and formaldehyde in at least a two step and optionally a three-step process.

In this aspect, for example, the first step, a cyclic triazone/triazine polymer is formed. Urea and formaldehyde are mixed in the presence of ammonia under an alkaline reaction condition, at an F/U mole ratio of between about 1.2:1 and 1.8:1. The ammonia is supplied in an amount sufficient to yield an ammonia:urea mole ratio of between about 0.05:1 and 1.2:1, preferably between about 0.2:1 and 0.8:1. The alkalinity of the reaction mixture is maintained at a pH of about 8.0 to 10.0, preferably about 8.7 to 9.3. The alkalinity can be maintained by adding an alkali metal hydroxide such as sodium, lithium or potassium hydroxide, preferably sodium hydroxide, or other compounds such as alkali metal carbonates, alkaline earth hydroxides, organic amines.

The mixture is heated quickly to a temperature of about 85.degree. to 105° C., preferably about 95° C., and the mixture is maintained at that temperature for a time sufficient for the reaction to form the cyclic triazone/triazine polymer. The amount of a time sufficient for the reaction to proceed to the desired extent varies depending on the particular reaction conditions, but is usually about 45 to 135 minutes, and particularly about 90 minutes.

In the second step, a thermosetting polymer is formed from the cyclic polymer. The reaction mixture containing triazole/triazine polymer formed in step one is cooled to a temperature of between about 60.degree. to 90° C., preferably about 85° C., and then additional formaldehyde is added, preferably with additional urea, to yield a higher cumulative F/U mole ratio of between about 1.5:1 to 3.0:1, preferably between about 1.9:1 and 2.7:1. A sufficient amount of mild acid is also added to adjust the pH to a value low enough to permit good control of the rate of condensation with a preferred pH being about 6.0 to 6.4. Mild acids include a dilute mineral acid, an organic acid or an acid salt, such as ammonium chloride, ammonium sulfate, etc., or alum that is diluted to a controlled concentration and can be added for pH adjustment before or after the formaldehyde. The reaction is then continued under this mildly acidic condition at a temperature of between about 70.degree. to 105° C., preferably about 85° C. for a time sufficient to form the thermosetting polymer. A typical, but not limiting, reaction time is about 10 to 90 minutes, most often about 45 minutes, to ensure proper advancement of polymer condensation reaction.

The polymer then is cooled to an appropriate temperature, for example, to a temperature of about 80° C. The polymer may be cooled in stages, for example, the polymer may be cooled first to about 80° C. over about 15 minutes and then to about 75° C. The cooling time and temperature may be varied and selection of particular conditions is within the skill of the art by routine testing. As the polymer cools, the pit falls to about 4.3 to 4.9, preferably about 4.5, and the viscosity of the polymer increases. Once the desired viscosity is reached, for example, 100 to 225 centipoise, the resin is cooled to room temperature. The resin can be used promptly or is further treated and stored.

If the resin is not used immediately, a third neutralization step should be employed. In this step, the resin is neutralized with, for example, an alkali metal hydroxide such as sodium, lithium, or potassium hydroxide, preferably sodium hydroxide, to enhance its storage stability. Other neutralizing agents include alkali metal carbonates, alkaline earth hydroxides and organic amines.

The reactants may also include a small amount of a resin modifier such as ethylenediamine (EDA). Additional modifiers, such as melamine, ethylene ureas, and primary, secondary and triamines, for example, dicyanodiamide can also be incorporated into the resin of the invention. Concentrations of these modifiers in the reaction mixture may vary from 0.05 to 5.00%. These types of modifiers promote hydrolysis resistance, polymer flexibility and lower formaldehyde emissions.

The cyclic urea prepolymer is then used as a modifier of the resin. The modifier level using the cyclic urea prepolymer, reported as a percent of binder solids, is preferably from 1% to 95%, but greater amounts are also contemplated. Binder solids refer to the percent phenol-formaldehyde resin solids plus the percent modifier solids. Thus, typically the resin and cyclic urea prepolymer are combined to obtain 5 to 99 wt % resin solids and 1 to 95 wt % cyclic urea prepolymer solids. Preferred ranges are dependent on the application.

Further urea additions for purposes of scavenging formaldehyde or as a diluent also may be used although should not normally be needed.

The resin of the invention also is advantageously used in the preparation of glass fiber mats to be used, for example, in the manufacture of roofing shingles. In this aspect, the binder resin is applied to a glass fiber mat before the mat passes through a drying oven where the mat is dried and the incorporated binder resin is cured. Glass fiber mats so-produced with the resin of this invention exhibit, among other things, low formaldehyde emission. The low formaldehyde emissions of these resins is a useful aspect of these resins for the utility disclosed herein.

Condensation reaction products of the amine-aldehyde, amide-aldehyde, and/or amidine-aldehyde adducts described above include, for example those products resulting from the formation of (i) methylene bridges between amido nitrogens by the reaction of alkylol and amino groups, (ii) methylene ether linkages by the reaction of two alkylol groups, (iii) methylene linkages from methylene ether linkages with the subsequent removal of formaldehyde, and (iv) methylene linkages from alkylol groups with the subsequent removal of water and formaldehyde.

Generally, in preparing the resin, the molar ratio of aldehyde:primary or secondary amine is from about 1.5:1 to about 4:1, which refers to the ratio of moles of all aldehydes to moles of all amines, amides, and amidines reacted to prepare the resin during the course of the adduct formation and condensation reactions described above, whether performed separately or simultaneously. The resin is normally prepared under ambient pressure. The viscosity of the reaction mixture is often used as a convenient proxy for the resin molecular weight. Therefore the condensation reaction can be stopped when a desired viscosity is achieved after a sufficiently long time and at a sufficiently high temperature. At this point, the reaction mixture can be cooled and neutralized. Water may be removed by vacuum distillation to give a resin with a desired solids content. Any of a wide variety of conventional procedures used for reacting primary and secondary amine and aldehyde components can be used, such as staged monomer addition, staged catalyst addition, pH control, amine modification, etc., and the present invention is not limited to any particular procedure.

A representative amine-aldehyde resin for use in separation processes of the present invention is a urea-formaldehyde resin. As described above, a portion of the urea may be replaced by other reactive amine and/or amides and a portion of the formaldehyde may be replaced by other aldehydes, to provide various desirable properties, without departing from the characterization of the resin as a urea-formaldehyde resin. Urea-formaldehyde resins can be prepared from urea and formaldehyde monomers or from precondensates in manners well known to those skilled in the art. Typically, the urea and formaldehyde are reacted at a molar ratio of formaldehyde to urea (F:U) in the range from about 1.75:1 to about 3:1, and usually at a formaldehyde:urea (F:U) mole ratio from about 2:1 to about 3:1, in order to provide sufficient methylolated species for resin cross-linking (e.g., di- and tri-methylolated ureas). Generally, the urea-formaldehyde resin is a highly water dilutable dispersion, if not an aqueous solution.

Other suitable amine-aldehyde resins useful in this invention include those that have utility as binders for glass mats as disclosed in U.S. Pat. No. 5,389,716. In this aspect, for example, the weight ratio of the aldehyde condensation polymer to the latex in the binder composition disclosed in U.S. Pat. No. 5,389,716 is greater than or equal to 1:1 on a nonvolatile basis. Accordingly, the latex ranges from 50 to about 95 percent by weight and the aldehyde condensation polymer ranges from about 5 to 50 percent by weight based on the weight of the latex and the aldehyde condensation polymer. In one preferred embodiment, the silica colloid ranges from about 0.1 to about 10% by weight based on the weight of the resin (aldehyde condensation polymer) on a nonvolatile basis. In another preferred embodiment, the aldehyde condensation polymer is a modified urea-aldehyde condensate and the silica colloid ranges from 0 to about 10% by weight based on the resin on a non-volatile basis.

Many of the aldehyde condensation polymers of phenol, resorcinol, urea, and melamine have been widely used as adhesives and their properties are well known. The aldehyde condensation polymers which can be used in this invention have reactive alkylol groups, and are well known and commercially available. These polymers may be cationic, anionic or nonionic, preferably nonionic. As earlier noted, a key constraint is compatibility of the resin with the latex. In this context, compatibility refers the ability to mix the latex and the resin together without premature solids formations such as by precipitation or coagulation. "Polymers", as used herein, means resinous mixtures which do not crystallize or have a sharp melting point. Particularly, preferred polymers are those having "reactive alkylol groups" which are alkylol groups capable of reacting with ammonia or the amines used in this invention to modify the aldehyde condensation polymers. "Condensation" is used herein to mean a polymerization reaction in which a molecule, such as water, is eliminated and is to be distinguished from "addition" in which no by-product is formed. Further, the aldehyde condensation polymers used in this invention exclude those having dominant amide forming substituents.

Three classes of polymers can also be preferred: phenoplasts, aminoplasts, and ketone-aldehyde condensation polymers. They include such resins as the acid or base catalyzed phenol-aldehyde resins, urea-aldehyde resins, melamine-aldehyde resins, acetone-aldehyde resins, etc. The following references cited in U.S. Pat. No. 3,896,081 disclose methods of preparing the condensation resins useful in this invention: "The Chemistry of Synthetic Resins" by Carleton Ellis, Reinhold Publishing Co., 1935; "Phenolic Resin Chemistry" by N. J. L. Megson, Academic Press Inc., New York, 1958; "Aminoplasts" by C. P. Vale, Cleaver-Hume Press Ltd., London, England; and British Pat. No. 480,316. See also U.S. Pat. No. 4,794,051 (phenoplasts) and U.S. Pat. No. 4,169,914 (aminoplasts).

Specifically, the aldehyde condensation polymers which can be used include (1) phenoplasts comprising the condensation polymers of an aldehyde such as formaldehyde with a phenolic type material having at least two positions ortho and/or para to the hydroxyl group open for reaction, such as phenol, phenol-resorcinol, xylenol, cresol, resorcinol, and their derivatives, (2) aminoplasts comprising the condensation polymers of an aldehyde such as formaldehyde with compounds such as benzoguanamine, dicyandiamide, urea, melamine-urea, melamine, and their derivatives, and (3) ketone-aldehyde condensation polymers such as acetone-formaldehyde, methyl ethyl ketone formaldehyde, methylisobutyl ketone formaldehyde, and the like. The preferred resins are water-soluble, liquid, thermosetting urea-aldehyde resins, more preferably urea-formaldehyde resins. Urea-aldehyde resins are lower in smoke production, particularly if free monomer is less than 2 percent. Novolacs, because they lack reactive alkylol groups and lack water solubility, are not directly useful in this invention; they may be further reacted with aldehyde to convert them to useful resoles. Each of the aldehyde condensation polymers mentioned above is prepared and kept under conditions which prevent it from condensing to an infusible state by known methods.

The aldehyde used in preparation of the condensation polymer may be (1) monofunctional (i.e., a monoaldehyde), or (2) polyfunctional, having at least two aldehyde groups separated by at most one carbon atom, and can be, for instance, formaldehyde, paraformaldehyde, polyoxymethylene, trioxane, acrolein, and aliphatic or cyclic aldehydes such as glyoxal, acetaldehyde, propionaldehyde, butyraldehyde, and furfuraldehyde. Condensation, when using formaldehyde, furfuraldehyde, paraformaldehyde, polyoxymethylene or trioxane, is generally accomplished with the use of a mildly acid, alkaline, or no catalyst. When using acrolein, glyoxal, acetaldehyde, propionaldehyde, or butyraldehyde, condensation is generally accomplished by combining the reactants in the presence of a strongly acid catalyst, neutralizing the reaction product, adding more aldehyde, and further reacting in the presence of a mildly acid, or alkaline, catalyst. See generally U.S. Pat. No. 3,896,081.

The aldehyde condensation polymers mentioned above may be modified by reacting either the condensation reactants during the condensation reaction or the condensation polymer after the condensation reaction with ammonia, preferably aqueous ammonia, or a primary polyamine, preferably a primary diamine, to yield a modified aldehyde condensation polymer. An example of the latter is disclosed in U.S. Pat. No. 3,896,081 to Baxter et al., which is incorporated herein by reference. Preferably, the modified aldehyde condensation polymer is produced by reacting the condensation reactants during the condensation reaction with the ammonia or a primary polyamine, preferably an alkyl primary diamine, more preferably a $C_1$-$C_6$ alkyl primary diamine, for example ethylene diamine. The ammonia may be aqueous ammonia or anhydrous ammonia.

The aldehyde condensation polymer-based resin of the binder composition are also commercially available materials, for example, urea-formaldehyde resins such as the types sold by Georgia Pacific Resins, Inc., Atlanta, Ga. (such as GP-2904 and GP-2914), sold by Borden Chemical Company, Columbus, Ohio, and sold by Neste' Resins Corporation, Eugene, Oreg., for glass mat applications may be used. These resins generally are modified with methylol groups which upon curing form methylene or ether linkages. Such methylols may include N,N'-dimethylol; dihydroxymethylolethylene; N,N'-bis(methoxymethyl), N,N'-dimethylolpropylene; 5,5-dimethyl-N,N'-dimethylolpropylene; N,N'-dimethylolethylene; N,N'-dimethylolethylene and the like.

In one embodiment, the condensation is allowed to proceed to an extent such that the urea-formaldehyde resin has a number average molecular weight ($M_n$), of greater than about 100 grams/mole, and often greater than about 300 grams/mole. Good results in separation processes have been achieved with urea-formaldehyde base resin molecular weights in the range from about 400 to about 4000 grams/mole and also in the range from about 400 to about 1200 grams/mole. As is known in the art, the value of $M_n$ of a polymer sample having a distribution of molecular weights is defined as $$M_n = \frac{\sum_i N_i M_i}{\sum_i N_i},$$

where $N_i$ is the number of polymer species having i repeat units and $M_i$ is the molecular weight of the polymer species having i repeat units. The number average molecular weight is typically determined using gel permeation chromatography (GPC), using solvent, standards, and procedures well known to those skilled in the art.

A cyclic urea-formaldehyde resin may also be employed and prepared, for example, according to procedures described in U.S. Pat. No. 6,114,491.

A further aspect of the present invention concerns the discovery that a cyclic urea prepolymer, formed by a reaction of urea, formaldehyde, and ammonia or a primary amine, is useful as a modifier in phenol-formaldehyde resins and melamine-formaldehyde resins. The present invention can be used to further modify a resin system either by reacting into the base resin system, blending with the completed base resin system, or blending into a binder preparation.

The resins may then be used in compositions as disclosed herein or in binder compositions, which comprise a variety of liquid forms, including solutions, miscible liquids, or dispersions and the like and combinations of such liquid forms depending upon the optional ingredients blended into the binder composition. Where the term solution or any of the variations thereof is used herein it is intended to include any relatively stable liquid phase.

As disclosed, the cyclic urea prepolymer may be prepared by any suitable method. For example, urea, formaldehyde, and ammonia or primary amine are mixed and heated to the desired temperature for a set period of time to form a cyclic urea prepolymer. Preferably the mole ratio of reactants for the cyclic urea prepolymer are as follows:

| | |
|---|---|
| Formaldehyde: | About 0.1 to 3.0 |
| Ammonia or Primary Amine: | About 0.1 to 1.0 |
| Urea: | About 0.1 to 1.0 |

Any combination of the above mole ratios is contemplated; however, preferably the mole ratio of Urea:Formaldehyde: Ammonia or Primary Amine is about 2.0:2.0:1.0 to 1.0:4.0: 1.0 and more preferably about 2.0:4.0:1.0 depending on the application. It is contemplated that "ammonia or primary amine" also encompasses the use of both ammonia and a primary amine or more than one primary amine.

Urea, formaldehyde, and ammonia reactants are used in a mole ratio of urea formaldehyde:ammonia that may be about 0.1 to 1.0: about 0.1 to 3.0: about 0.1 to 1.0. These reactants are charged to a reaction vessel while maintaining the temperature below about 70° C. (160° F.), often about 60° C. (140° F.). The order of addition is not critical, but it is important to take care during the addition of ammonia to formaldehyde (or formaldehyde to ammonia), due to the exothermic reaction. In fact, due to the strong exotherm, it may be preferred to charge the formaldehyde and the urea first, followed by the ammonia. This sequence of addition allows one to take advantage of the endotherm caused by the addition of urea to water to increase the rate of ammonia addition. A base may be required to maintain an alkaline condition throughout the cook.

Once all the reactants are in the reaction vessel, the resulting solution is heated at an alkaline pH to between about 60 and 105° C. (about 140 to about 220° F.), often about 85 to 95° C. (about 185 to 205° F.), for 30 minutes to 3 hours, depending on mole ratio and temperature, or until the reaction is complete. Once the reaction is complete, the solution is cooled to room temperature for storage. The resulting solution is storage stable for several months at ambient conditions. The pH is between 5 and 11.

The yield is usually about 100%. The cyclic urea resins often contain at least 20% triazone and substituted triazone compounds. The ratio of cyclic ureas to di- and tri- substituted ureas and mono-substituted ureas varies with the mole ratio of the reactants. For example, a cyclic urea resin having the mole ratio of 1.0:2.0:0.5 U:F:A resulted in a solution characterized by $C^{13}$-NMR and containing approximately 42.1% cyclic ureas, 28.5% di/tri-substituted ureas, 24.5% mono-substituted ureas, and 4.9% free urea. A cyclic urea resin having the mole ratio of 1.0:1.2:0.5 U:F:A resulted in a solution characterized by $C^{13}$-NMR and containing approximately 25.7% cyclic ureas, 7.2% di/tri-substituted ureas, 31.9% mono-substituted ureas, and 35.2 free urea.

The phenol-formaldehyde resole may be prepared by any suitable manner. For example, the phenol-formaldehyde resin may be prepared by reacting a molar excess of formaldehyde with phenol under alkaline reaction conditions. Formaldehyde is used in an amount of between about 0.5 and 4.5 moles per mole of phenol, with preferred ranges dependent on the application. The % free formaldehyde is typically between 0.1% and 15%. And the % free phenol is typically between 0.1% and 20%. Preferred ranges depend on the application.

Alkaline reaction conditions are established by adding an alkaline catalyst to an aqueous solution of the phenol and formaldehyde reactants. During the initial reaction of the phenol and formaldehyde, only that amount of alkaline catalyst necessary to produce a resin need be added to the reaction mixture. Suitable amounts of alkaline catalyst are known to those skilled in the art. Typically, at least about 0.005 mol of alkaline catalyst per mol of phenol is used, with an amount between about 0.01 and 1 mol per mol depending on the application. All the catalyst can be added initially to the reactants or the catalyst can be added incrementally in two or more additions or continuously over a defined time period.

Alkaline catalysts normally used for preparing phenol-formaldehyde resins also can be used in accordance with the present invention. Typical alkaline catalysts include alkali metal and alkali earth hydroxides such as lime, lithium hydroxide, sodium hydroxide and potassium hydroxide; alkali metal carbonates such as sodium carbonate and potassium carbonate; and amines. Based on considerations of cost and availability, sodium hydroxide is used most often.

The cyclic prepolymer may be reacted into the phenol-formaldehyde resin or added as a post blend depending upon the needs of the resin. The preferred method is dependent on the application. For example, the cyclic urea prepolymer is blended with the prepared phenol-formaldehyde resin to produce a binder suitable for insulation.

It may be preferable to react the cyclic urea prepolymer with formaldehyde before attempting to react the material with phenol to tie it into the overall polymer structure. Typically cyclic urea prepolymer is reacted with formaldehyde (50%) at a ratio of about 4 to 1, preferably about 2:1 by adding the two together in a suitable container, adjusting the pH to about 8.5 to 10.0, preferably about 9.0 to 9.5 and heating to 80 to 100° C., preferably about 90 to 95° C. The mixture is reacted under these conditions for about two hours. This product is then added to the front of the phenol-formaldehyde resin with half of the formaldehyde that was added taken out from the resins formaldehyde charge. The resin is normalized and used for its application.

The reaction with phenol is achieved by adding the pre-methylolated cyclic urea prepolymer to all the phenol normally used to make the base resin and adding NaOH (50%) to bring the pH to about 9.5 to 11.5, preferably about 10.5. The mixture is heated to about 80 to 100° C., preferably about 90-95° C. for about one hour or longer depending upon the pH. The product of this step is a phenol-cyclic urea prepolymer reaction product that can be used to make the base resin.

Concentration of raw materials is not critical. Water can be added, or removed by distillation, to adjust the % non-volatiles to the desired level. The resin and cyclic urea prepolymer are combined to obtain 1 to 95 wt % cyclic urea prepolymer solids, preferably 10 to 70 wt %. Preferred ranges are dependent on the application.

In addition, the cyclic urea-formaldehyde resin may be prepared by a method such as described in U.S. Pat. No. 5,674,971. The cyclic urea resin is prepared by reacting urea and formaldehyde in at least a two step and optionally a three-step process. In the first step, conducted under alkaline reaction conditions, urea and formaldehyde are reacted in the presence of ammonia, at an F/u mole ratio of between about 1.2:1 and 1.8:1. The ammonia is supplied in an amount sufficient to yield an ammonia/urea mole ratio of between about 0.05:1 and 1.2:1. The mixture is reacted to form a cyclic triazone/triazine or cyclic urea resin.

Water soluble triazone compounds may also be prepared by reacting urea, formaldehyde and a primary amine as described in U.S. Pat. Nos. 2,641,584 and 4,778,510. These patents also describe suitable primary amines such as, but are not limited to, alkyl amines such as methyl amine, ethyl amine, and propyl amine, lower hydroxyamines such as ethanolamine cycloalkylmonoamines such as cyclopentylamine, ethylenediamine, hexamethylenediamine, and linear polyamines. The primary amine may be substituted or unsubstituted.

In the case of a cyclic urea-formaldehyde or a urea-formaldehyde resin, skilled practitioners recognize that the urea and formaldehyde reactants are commercially available in many forms. Any form which is sufficiently reactive and which does not introduce extraneous moieties deleterious to the desired reactions and reaction products can be used in the preparation of urea-formaldehyde resins useful in the invention. For example, commonly used forms of formaldehyde include paraform (solid, polymerized formaldehyde) and formalin solutions (aqueous solutions of formaldehyde, sometimes with methanol, in 37 percent, 44 percent, or 50 percent formaldehyde concentrations). Formaldehyde also is available as a gas. Any of these forms is suitable for use in preparing a urea-formaldehyde resin. Typically, formalin solutions are used as the formaldehyde source. To prepare the resin of the present invention, formaldehyde may be substituted in whole or in part with any of the aldehydes described above (e.g., glyoxal).

Urea-formaldehyde resins such as the types sold by Georgia Pacific Resins, Inc., Borden Chemical Co., and Neste Resins Corporation may be used. These resins are prepared as either low molecular weight condensates or as adducts which, as described above, contain reactive methylol groups that can undergo condensation to form resin polymers, often within the number average molecular weight ranges described previously. The resins will generally contain small amounts of unreacted (i.e., free) urea and formaldehyde, as well as cyclic ureas, mono-methylolated urea, and di- and tri-methylolated ureas. The relative quantities of these species can vary, depending on the preparation conditions (e.g., the molar formaldehyde:urea ratio used). The balance of these resins is generally water, ammonia, and formaldehyde. Various additives known in the art, including stabilizers, cure promoters, fillers, extenders, etc., may also be added to the resin.

The amine-aldehyde resins described above are highly selective for binding with unwanted solid materials (e.g., sand or clay) and/or ionic species such as metallic cations to be separated in the separation/purification processes of the present invention. Without being bound by theory, the amine-aldehyde resin of the present invention, in one embodiment, is generally cationic (i.e., carries more overall positive than negative charge) to attract most clay surfaces, which are generally anionic (i.e., carry more overall negative than positive charge). These differences in electronic characteristics between the resin and clay can result in mutual attraction at multiple sites and even the potential sharing of electrons to form covalent bonds. The positive-negative charge interactions which cause clay particles to become attracted to the resin is potentially explained by several theories, such as host-guest theory (including podands), hard-soft acid base theory, dipole-dipole interactions, Highest Occupied Molecular Orbital-Lowest unoccupied Molecular Orbital (HOMO-LUMO) interactions, hydrogen bonding, Gibbs free energy of bonding, etc.

Silica, silicates, and/or polysiloxanes may be used in conjunction (e.g., added as a blending component) with the amine-aldehyde resin of the present invention to potentially improve its affinity for various materials, especially siliceous materials including sand and clay, whether these materials be desired or unwanted in any particular application. Other agents that may be used to improve the performance of resins in the separation processes of the present invention include polysaccharides, polyvinyl alcohol, polyacrylamide, as well as known flocculants (e.g., alginates). These agents can likewise be used with modified urea-formaldehyde resins wherein, as described above, at least a portion of the urea is replaced with ammonia or an amine as described above (e.g., primary alkylamines, alkanolamines, polyamines, etc.). Otherwise, such agents can also be used with resins which are modified with anionic functional groups (e.g., sulfonate) or stabilized by etherification with an alcohol (e.g., methanol), as described below.

Silica in the form of an aqueous silica sol, for example, is available from Akzo Nobel under the Registered Trademark "Bindzil" or from DuPont under the Registered Trademark "Ludox". Other grades of sol are available having various particle sizes of colloidal silica and containing various stabilizers. The sol can be stabilized by alkali, for example sodium, potassium, or lithium hydroxide or quaternary ammonium hydroxide, or by a water-soluble organic amine such as alkanolamine.

Silicates, such as alkali and alkaline earth metal silicates (e.g., lithium silicate, sodium-lithium silicate, potassium silicate, magnesium silicate, and calcium silicate), as well as ammonium silicate or a quaternary ammonium silicate, may also be used in the preparation of the resin. Additionally, stabilized colloidal silica-silicate blends or mixtures, as described in U.S. Pat. No. 4,902,442, are applicable.

In the separation processes of the present invention, the amine-aldehyde resin may be employed in the form of a solution or dispersion having a resin solids contents generally ranging from about 0.1% to about 90% by weight. Good performance, for example, is obtained when the resin is prepared in a solution or dispersion, having a solids content from about 30% to about 90%, and typically from about 45% to about 70%. Otherwise, "neat" forms of the resin, having little or no added solvent or dispersing agent (e.g., water), may also be employed. When an essentially "neat" form of the amine-aldehyde resin, having few or no volatile components, is employed, the pure resin may be added (e.g., as a viscous liquid, a gel, or a solid form, such as a powder), to the froth flotation slurry or liquid dispersion to be purified, such that an aqueous resin solution or dispersion is formed in situ. Neat forms of the amine-aldehyde resins may be obtained from solutions or dispersions of these resins using conventional drying techniques (e.g., spray drying). In some cases, therefore, a resin solids content of greater than about 90% by weight may be used. Forms of the amine-aldehyde resin at such high solids levels include viscous liquids, gels, melts, or solid forms including prill, lump, flake, or powders (e.g., spray dried materials).

In any event, usually at least about 90% by weight, and often at least about 95% by weight, of the amine and aldehyde components, used to form the resin, are reacted, in order to reduce the amounts of free (unreacted) amines and aldehydes. This practice more efficiently utilizes the amine and aldehyde components in the production of the resin polymer, while minimizing any deleterious effects (e.g., vaporization into the environment) associated with these components in their free form. Overall, amine-aldehyde resins for use in separation processes of the present invention generally contain from about 40% to about 100% resin solids or non-volatiles, and often 55% to 75% non-volatiles. Such resins may, however, be diluted to a lower solids content (e.g., below about 30% by weight), for example, using a brine solution together with a thickener such as poly(acrylic acid) for storage. The non-volatiles content is measured by the weight loss upon heating a small (e.g., 1-5 gram), sample of the composition at about 105° C. for about 3 hours. Aqueous solutions or dispersions of the resins of the present invention will generally be a clear liquid or a liquid having a white or yellow appearance. They will typically have a Brookfield viscosity from about 75 to about 500 cps and a pH from about 6.5 to about 9.5. The free formaldehyde content and free urea content of urea-formaldehyde resin solutions are each typically below 5%, usually are each below 3%, and often are each below 1%. A low content of formaldehyde is generally achieved due to health concerns associated with exposure to formaldehyde emissions. If desired, conventional "formaldehyde scavengers" that are known to react with free formaldehyde may be added to reduce the level of formaldehyde in solution. Low amounts of free urea are also desirable, but for different reasons. Without being bound by theory, free urea is not believed to have the requisite molecular weight, (1) in froth flotation separations, to "blind" the gangue or desired (e.g., clay) materials to their interaction with rising air bubbles, (2) in the purification of liquid dispersions, to agglomerate a sufficiently large number of solid contaminant particles into flocs, or (3) in the removal of ionic species from aqueous solutions, to bind these species to a molecule of sufficient size for retention by filtration. In particular, it has been found that resin polymers having a number average molecular weight of greater than about 100 grams/mole, and often greater than about 300 grams/mole exhibit the mass needed to promote efficient separations.

Froth Flotation

When used as depressants in froth flotation separations, resins of the present invention, due to their high selectivity, provide good results at economical addition levels. For example, the resins may be added in an amount from about 100 to about 1000 grams, and typically from about 400 to about 600 grams, based on resin solution or dispersion weight, per metric ton of the material (e.g., clay-containing ore) that is to be purified by froth flotation. In general, the optimal addition amount for a particular separation can be readily ascertained by those of skill in the art and depends on number of factors, including the type and amount of impurities.

Amine-aldehyde resins can be applied in the froth flotation of a wide variety of value materials (e.g., minerals or metals such as phosphate, potash, lime, sulfate, gypsum, iron, platinum, gold, palladium, titanium, molybdenum, copper, uranium, chromium, tungsten, manganese, magnesium, lead, zinc, clay, coal, silver, graphite, nickel, bauxite, borax, borate, or high molecular weight hydrocarbons such as bitumen). Often, the raw material to be purified and recovered contains sand or clay, for which the resin depressants described herein are especially selective.

Although clay is often considered an impurity in conventional metal or mineral ore beneficiation, it may also be present in relatively large quantities, as the main component to be recovered. Some clays, for example kaolin clay, are valuable minerals in a number of applications, such as mineral fillers in the manufacture of paper and rubber. Thus, one froth flotation process in which the resin of the present invention may be employed involves the separation of clay from a clay-containing ore. The impurities in such ores are generally metals and their oxides, such as iron oxide and titanium dioxide, which are preferentially floated via froth flotation. Other impurities of clay-containing ores include coal. Impurities originally present in most Georgia kaolin, which are preferentially floated in the purification method of the present invention, include iron-bearing titania and various minerals such as mica, ilmenite, or tourmaline, which are generally also iron-containing.

Thus, the clay, which selectively associates with the amine-aldehyde resin of the present invention, is separately recoverable from metals, metal oxides, and coal. In the purification of clay, it is often advantageous to employ, in conjunction with the resin of the present invention as a depressant, an anionic collector such as oleic acid, a flocculent such as polyacrylamide, a clay dispersant such as a fatty acid or a rosin acid, and/or oils to control frothing. One approach, particularly in the refining of clay-containing ores, involves the modification of the resin with an anionic functional group, as described in greater detail below.

Other representative froth flotation processes of the present invention involve the beneficiation of coal, as well as other value metals and minerals discussed above, in which the removal of siliceous gangue materials such as sand and/or clay and other impurities is an important factor in achieving favorable process economics. Metal and mineral ores, for example, generally comprise a mixture of mineral impurities, in addition to the value metal or mineral which is desirably recovered in the froth concentrate. These impurities can include halite (NaCl), clay, and carbonate minerals which are non-soluble in water, such as aluminum silicates, calcite, dolomite, and anhydrite. Other ore impurities include iron oxides, titanium oxides, iron-bearing titania, mica, ilmenite, tourmaline, aluminum silicates, calcite, dolomite, anhydrite, ferromagnesian, feldspar, and debris or various other solid impurities such as igneous rock and soil. In the case of coal beneficiation, non-combustible solid materials such as calcium magnesium carbonate are considered impurities.

The resin of the present invention is also advantageously employed in the separation of bitumen from sand and/or clay that are co-extracted from natural oil sand deposits. Bitumen/sand mixtures that are removed from oil or tar sand deposits, often within several hundred feet of the earth's surface, are generally first mixed with warm or hot water to create an aqueous slurry of the oil sand, having a reduced viscosity that facilitates its transport (e.g., by pipeline) to processing facilities. Steam and/or caustic solution may also be injected to condition the slurry for froth flotation, as well as any number of other purification steps, described below. Aeration of the bitumen-containing slurry, comprising sand or clay, results in the selective flotation of the bitumen, which allows for its recovery as a purified product. This aeration may be effected by merely agitating the slurry to release air bubbles and/or introducing a source of air into the bottom of the separation cell. The optimal amount of air needed to float the desired bitumen, without entraining excessive solid contaminants, is readily determined by one of ordinary skill in the art.

Thus, the use of the resin depressant of the present invention advantageously promotes the retention of the sand and/or clay impurities in an aqueous fraction, which is removed from the bottom section of the froth flotation vessel. This bottoms fraction is enriched (i.e., has a higher concentration of) the sand and/or clay impurities, relative to the initial bitumen slurry. The overall purification of bitumen may rely on two or more stages of flotation separation. For example, the middle section of a primary flotation separation vessel may contain a significant amount of bitumen that can ultimately be recovered in a secondary flotation of this "middlings" fraction.

The amine-aldehyde resin may also benefit the froth flotation of value materials described herein to remove metallic contaminants and heavy metals in particular, including mercury, cadmium, lead, and arsenic as well as compounds containing these heavy metals. The treatment of an ore slurry with the resin may alternatively be accompanied by, rather than froth flotation, any of the types of separations discussed below (e.g., filtration, cyclone separation, flotation without the use of rising air bubbles, etc.), as well as dissolved air flotation, as discussed below with respect to the removal of mercury from synthetic gypsum. In the case of heavy metal contaminant removal, the purification of coal represents a specific application of increasing environmental significance. Coal typically contains, for example, on the order of 0.03-0.3 parts per million (ppm) of total mercury by weight, on a volatile free basis (or non-volatile basis, as described herein). Ever-tightening regulatory standards for airborne mercury emissions have led to requirements for highly effective mercury abatement systems (e.g., activated carbon sorbent materials) on flue gas emissions from coal-fired power plants. The burden on such systems may therefore be reduced through the beneficiation of coal ore that is employed in power generation, in order to reduce the content of total mercury present therein. Currently, about 100 million tons of coal ore are processed using conventional froth flotation.

Mercury may also accumulate in systems designed for reducing sulfur emissions (primarily $SO_2$) from coal-fired power plants. Sulfur removal and recovery, for example, is often accomplished through flue gas desulfurization processes that involve scrubbing (or contacting) the effluent gases from coal combustion with an aqueous alkaline solution that readily dissolves, reacts with, and neutralizes sulfur oxide contaminants. Often, an economically attractive method of sulfur recovery involves the use of aqueous calcium hydroxide (or lime) as the scrubbing medium, which reacts with sulfur oxides to form calcium sulfate, also known as synthetic gypsum. The resulting slurry of precipitated synthetic gypsum may be filtered to reduce its moisture content and further processed in conventional gypsum operations such as in the production of gypsum wallboard.

The presence of mercury in coal can therefore ultimately lead to mercury contamination in synthetic gypsum produced via flue gas desulfurization. In particular, trace amounts of gaseous mercury in flue gas tend to collect in alkaline scrubbing solutions. Moreover, gaseous hydrogen chloride, also normally present in flue gas, converts elemental mercury to $HgCl_2$, which can adhere to the precipitated, solid synthetic gypsum particles.

Treatment of the synthetic gypsum slurry with a depressant comprising the amine-aldehyde resin of the present invention, combined with froth flotation or other separation methods as described herein, allows for a reduction in the level of mercury contamination. It is also possible to form a slurry of synthetic gypsum that has been dehydrated, for example using filtration as described above, and thereafter treat this slurry with the resin, in order to effectively reduce the quantity of mercury via froth flotation. Preferably, however, the inefficiencies associated with dehydration and subsequent rehydration are avoided by treating the slurry prior to filtration of the synthetic gypsum and subjecting this slurry to froth flotation. In any event, representative beneficiation methods of the present invention comprise treating a slurry of ore comprising coal or synthetic gypsum with a depressant comprising the amine-aldehyde resin of the present invention. In the case of synthetic gypsum, this material to be purified is preferably formed, as described above, during desulfurization of flue gas from a coal-burning power plant.

Treatment of a synthetic gypsum slurry may be combined with froth flotation either during or subsequent to the treatment. Beneficiation may alternatively involve any of the separation processes discussed herein (e.g., filtration, size or density classification, etc.). A particular separation process of interest in the removal of mercury from synthetic gypsum is known as dissolved air flotation (DAF), which may be facilitated using the amine-aldehyde resin. The use of DAF in the removal of algae and arsenic from water is described, for example, by Wert et al., Proceedings—Water Quality Technology Conference (2003), p. 902-918. Regardless of the nature of the separation, however, the recovery and/or purity of purified synthetic gypsum in a separation process for the removal of mercury may be enhanced using one or more chelating agents, as discussed below, in combination with the resin. Chelating agents particularly useful in the separation of mercury from synthetic gypsum will not only form a complex with mercury, but will also contain a functionality that improves the ability of the complexed species to selectively report to a desired stream, such as a froth concentrate (e.g., in a froth flotation where the purified synthetic gypsum product is selectively depressed). Such functionalities include those common in conventional collectors, which aid in flotation, or those which aid in solvation or solubilization of the complexed mercury.

In a representative beneficiation process using froth flotation, treatment of the coal or synthetic gypsum feed slurry with the amine-aldehyde resin may occur before or during the froth flotation. As a result of froth flotation, purified coal or purified synthetic gypsum may be selectively recovered in either the froth concentrate or selectively depressed into the bottoms or tailings stream, depending on the particular operating conditions employed. Likewise, mercury and mercury-containing compounds may be selectively floated or selectively depressed. Froth flotation parameters that determine which components are depressed or floated in a particular separation are well known to those having skill in the art. Normally, in the froth flotation of synthetic gypsum, purified synthetic gypsum is selectively depressed while the relatively smaller amounts of mercury and other contaminants are selectively floated. Conversely, the froth flotation of coal is normally performed such that the purified coal is selectively recovered in the froth concentrate while mercury and other impurities are selectively recovered in the bottoms or tailings stream.

In any event, whether mercury contaminants are selectively floated or depressed, their separation from the value mineral may be enhanced through the use of one or more conventional chelating agents in conjunction with the amine-aldehyde resin. A chelating agent may be added to the ore slurry together with the amine-aldehyde resin, or alternatively before or after the resin is added. Suitable chelating agents have the capacity to effectively bind or form a metal-ligand complex with mercury. Chelating agents may additionally improve coal beneficiation by removing iron contaminants and iron sulfide (pyrite) in particular. The reduction of both the iron and sulfur content of the purified coal improves both its fuel value (through the reduction of non-combustibles) as well as its acid gas emission characteristics (through the reduction of sulfur).

Chelating agents include, for example, multi-functional carboxylates such as hydroxyethylenediaminetriacetic acid (HEDTA), diethylenetriaminepentaacetic acid (DTPA), ethylenediaminetetraacetic acid (EDTA), diethyltriaminepentaacetic (DTPA), and nitrilotriacetic acid (NTA), which are typically used in their corresponding acetate salt forms (e.g., their sodium salt forms, such as pentasodium DTPA or trisodium NTA). These chelating agents include, for example, those in the Dissolvine® family of products (Akzo-Nobel Functional Chemicals bv, Netherlands), such as Dissolvine® H-40, Dissolvine® D-40, Dissolvine® D-40-L, and Dissolvine® A-150-S. Salts of oxalic acid (oxalate salts) may also be employed alone or in combination with these chelating agents. Amino acids are also useful as agents having a carboxylic acid group which can chelate with iron and other metal contaminants. When used in conjunction with the amine-aldehyde resin, the amine group of an amino acid can covalently react into the resin backbone, thereby providing the resin with a desired chelation functionality. Suitable amino acids include arginine, cysteine, serine, alanine, etc. Likewise, agents such as caprolactam and other cyclic amides can be hydrolyzed to form species having both amino and carboxylic acid functional groups which can similarly add chelation functionality to the amine-aldehyde resin.

Other classes of chelating agents include resins having sulfur atom-bearing functional groups, such as thiosemicarbazide and its derivatives. Thiosemicarbazide may be incorporated into resins such as styrene-divinylbenzene copolymers or ion exchange resins such as the weakly acidic Amberlite IRC-50® (Rohm and Haas Company, Philadelphia, Pa. USA). In the latter case, the resulting polymer contains a multidentate chelate ring containing O, N, and S donor sites. A representative thiosemicarbazide derivative functional group is diacetyl-bis(N-methylthiosemicarbazone).

Other sulfur-containing additives may likewise improve the efficiency (e.g., product purity and/or recovery) of froth flotation in the removal of mercury from coal or synthetic gypsum, and may therefore be employed in combination with the amine-aldehyde resin and optionally further in combination with one or more of the above-described chelating agents. Species having one or more mercapto functional groups, as well as one or more acid functional groups, are effective in this application and these include, for example, 2,3 dimercaptopropanesulfonate sodium (DMPS) and 2,3 meso dimercaptosuccinic acid (DMSA). Other sulfur-containing species such as alpha-lipoic acid, cysteine, and glutathione may also be employed for the formation of mercury complexes, resulting in improved sequestration of mercury in the froth flotation bottoms. Thioacid homologues of the carboxylic acid chelating agents discussed above, as well as their corresponding thioester derivatives, are also suitable for this purpose. Iodine-containing derivatives of any of the chelating agents discussed above may also be effective in the formation of stable complexes with mercury and other metal impurities. The effectiveness associated with any given amount of any of the above chelating agents, sulfur-containing compounds, or other additives for any particular application can be readily ascertained by those having skill in the art, in view of the present disclosure. In the case of a given sulfur containing compound, its effectiveness will depend not only on its affinity for mercury contaminants in coal or synthetic gypsum, but also on the ease of its separation, both in its complexed and un-complexed state, from the purified product.

Other additives which may be used in combination with the amine-aldehyde resin, to potentially improve its performance in coal ore beneficiation by froth flotation, include known reagents, collectors, frothers, promoters, and other agents used in this service, as described, for example, by Laskowski, COAL FLOTATION AND FINE COAL UTILIZATION, Elsevier (2001).

As a result of beneficiation, the final amount of total mercury present in the ore (e.g., comprising coal or synthetic gypsum) is less than the initial amount (i.e., the initial amount of total mercury is reduced), on a volatile free weight basis. In representative embodiments, the final amount of total mercury is less than about 10 parts per billion (ppb), less than about 5 ppb, or even less than 1 ppb. The final amount of total mercury may range, for example, from about 1 to about 100 ppb, from about 1 to about 10 ppb, or from about 5 to about 50 ppb. Any conventional method (e.g., inductively coupled plasma (ICP) or atomic absorption spectrometry (AAS) analysis) may be used in the determination of the total mercury amount, which refers to the amount of mercury present both in elemental form and in the form of mercury-containing compounds.

In the case of coal ore used in power plants, the removal of other impurities, in addition to heavy metals, can significantly improve the fuel value and/or the resulting combustion emissions of the purified coal recovered via froth flotation or other separation processes discussed herein. The reduction of nitrogen- and sulfur-containing compounds, for example, is important in many cases for compliance with nitrogen oxide and sulfur oxide emission tolerances designed to reduce the prevalence of these acid rain precursors in the environment. Froth flotation of an impure coal ore is conventionally employed for upgrading coal-fired power plant feedstocks in this manner. The removal of unwanted contaminants with froth flotation may be facilitated by treating an aqueous slurry of the impure coal ore with an amine-aldehyde resin of the present invention, either before or during the froth flotation. Conventional froth flotation in coal ore beneficiation is generally described, for example, at http://www.cg-inc.com/Coal_Primer.pdf. Purified coal recovered in the froth concentrate may have a reduced amount, relative to the impure coal, of an impurity such as nitrogen, sulfur, silicon, ash, or pyrite. The reduction in these impurities is determined on a volatile free basis, as described herein (e.g., on a volatile free weight basis).

The amount of nitrogen impurity refers to the total amount of nitrogen present in nitrogen-containing compounds in a coal sample, expressed in terms of a weight fraction (or weight-%, weight-ppm, etc.) of the element relative to the total volatile free sample weight. Other conventional measures and analyses may also be used to compare the relative amounts of nitrogen in the impure and purified coal samples, such as measurements of the total organic nitrogen, total basic nitrogen, etc. Sulfur and silicon impurities refer to the total amounts of sulfur and silicon present either in elemental form or in compounds containing these elements, also generally expressed as a weight fraction on a volatile free weight basis. Silicon generally represents a significant portion of the non-combustible ash component of coal. As such, beneficiation for the reduction in the amount of measured ash may similarly be facilitated according to methods described herein. Pyrite (or iron sulfide) is also normally measured on a volatile free weight basis, for comparison of the amount of this impurity in the purified coal relative to that in the impure coal ore. A reduction in pyrite content of coal reduces the amount of sulfur impurity and also improves the fuel value (e.g., measured in BTU/lb).

Other benefits associated with the use of the amine-aldehyde resin in the froth flotation of coal may therefore include an increased BTU value per unit weight, or alternatively (or in combination) a reduced amount of moisture. In any event, the reduced amount(s) of one or more (e.g., two or more, or all) of the impurities described above, in the purified coal recovered in the beneficiation, using froth flotation, of impure coal ore, is/are preferably less than the corresponding reference amount(s) in a purified reference coal recovered in the same froth flotation operation, but without using the amine-aldehyde resin. Preferred moisture levels of coal that is purified according to any of the methods described herein are less than bout 12% by weight, in the range from about 5% to about 12% by weight, and in the range from about 5% to about 10% by weight. Preferred fuel values are greater than about 12,000 BTU/lb, and in the range from about 12,000 to about 13,000 BTU/lb.

Generally, in any froth flotation process according to the present invention, at least 70% of the value material (e.g., bitumen or kaolin clay) is recovered from the raw material (e.g., the clay-containing ore), with a purity of at least 85% by weight. Also, conventional known collectors may be used in conjunction with resins of the present invention, when used as depressants. These collectors include, for example, fatty acids (e.g., oleic acid, sodium oleate, hydrocarbon oils), amines (e.g., dodecylamine, octadecylamine, α-aminoarylphosphonic acid, and sodium sarcosinate), and xanthanate. Likewise, conventional depressants known in the art can also be combined with the resin depressants. Conventional depressants include guar gum and other hydrocolloidal polysaccharides, sodium hexametaphosphate, etc. Conventional frothing agents that aid collection, (e.g., methylisobutylcarbinol, pine oil, and polypropylene oxides) may also be used, in accordance with normal flotation practice, in conjunction with the resin depressants of the present invention.

In froth flotation separations, the pH of the slurry to which the resins of the present invention, when used as depressants, are added will vary according to the particular material to be processed, as is appreciated by those skilled in the art. Commonly, the pH values range from neutral (pH 7) to strongly alkaline (e.g., pH, 12). It is recognized that in some flotation systems, high pH values (e.g., from about 8 to about 12.5) give best results.

Typically in froth flotation for the beneficiation of solid materials, the raw ore to be subjected to beneficiation is usually first ground to the "liberation mesh" size. The solid material may be ground to produce, for example, one-eighth inch average diameter particles prior to incorporation of the material into a brine solution to yield an aqueous slurry. After crushing and slurrying the material, the slurry may be agitated or stirred in a "scrubbing" process that breaks down some of the solids into very fine particles that remain in the brine as a muddy suspension. Some of these fines may be washed off the ore particles prior to froth flotation. Also, as is known in the art, any conventional size classification operations, some of which are discussed in greater detail below, may be employed to further reduce/classify raw material particle size, remove clay- or ash-containing brine, and/or recover smaller solid particles from the muddy brine, prior to froth flotation. Such size classification operations include further crushing/screening, cycloning, and/or hydro separation, any of which may be performed with or without the use of an amine-aldehyde resin.

Ore beneficiation according to the present invention comprises treating an aqueous slurry of the ore with a depressant comprising an amine-aldehyde resin, as described herein. The treatment of the ore slurry with the depressant typically involves combining the depressant and slurry (e.g., by adding the depressant to the slurry), normally in a manner such that the depressant is readily dispersed throughout. The treatment may occur before or during froth flotation, or before or during any of the other separation processes described herein (e.g., filtration, cyclone separation, dissolved air flotation, etc.). In the case of treatment before froth flotation, the treatment may also comprise conditioning the ore in the presence of the depressant, prior to froth flotation. Conditioning may be beneficial in allowing the depressant and ore slurry to thoroughly mix for a given time period, typically from about 30 seconds to about 10 minutes, prior to subjecting the mixture to aeration or froth flotation. During the conditioning time, the depressant can become associated, for example, with unwanted gangue material, thereby improving the performance of the subsequent froth flotation. Conditioning of a depressant/slurry mixture in the absence of aeration or froth flotation can occur in a separate conditioning vessel such as a mixer or mechanical flotation cell, pipe, barrel, etc. prior to transfer of the mixture to a froth flotation cell. Alternatively, conditioning can occur in the same vessel used for froth flotation. The same or different conditions in terms of temperature, pH, agitation, etc., may be used for conditioning and froth flotation. Typical conditions that may be employed in a conditioning step include a temperature from about 1° C. to about 95° C. and a pH of at least about 2.0, and often a pH from about 3.0 to about 7.0. Also, the same agents, as conventionally used and/or discussed herein, may be incorporated into the ore slurry in a conditioning step, in addition to the depressant. Such agents include collectors, activators, frothing agents, pH modifiers, etc.

In the froth flotation process, the slurry, typically having a solids content from about 10 to about 50% by weight, is transferred to one or more froth flotation cells. Air is forced through the bottoms of these cells and a relatively hydrophobic fraction of the material, having a selective affinity for the rising bubbles, floats to the surface (i.e., the froth), where it is skimmed off and recovered. A bottoms product that is hydrophilic relative to the froth concentrate, may also be recovered. The process may be accompanied by agitation. Commercially salable products can be prepared from the separate fractions recovered in this manner, often after further conventional steps, including further separation (e.g., by centrifuge), drying (e.g., in a gas fired kiln), size classification (e.g., screening), and refining (e.g., crystallization), are employed.

The froth flotation of the present invention may, though not always, involve flotation in "rougher cells" followed by one or more "cleanings" of the rougher concentrate. Two or more flotation steps may also be employed to first recover a bulk material comprising more than one component, followed by a selective flotation to separate these components. Amine-aldehyde resins of the present invention, when used as depressants, can be used to advantage in any of these steps to improve the selective recovery of desired materials via froth flotation. When multiple stages of froth flotation are used, the resins may be added using a single addition prior to multiple flotations or they may be added separately at each flotation stage.

Other Separations

Because of their affinity for solid contaminants in liquid suspensions or slurries, the amine-aldehyde resins of the present invention are applicable in a wide variety of separations, and especially those involving the removal of siliceous contaminants such as sand and/or clay from aqueous liquid suspensions or slurries of these contaminants. Such aqueous suspensions or slurries may therefore be treated with amine-aldehyde resins of the present invention, allowing for the separation of at least a portion of the contaminants, in a contaminant-rich fraction, from a purified liquid. A "contaminant-rich" fraction refers to a part of the liquid suspension or slurry that is enriched in solid contaminants (i.e., contains a higher percentage of solid contaminants than originally present in the liquid suspension or slurry). Conversely, the purified liquid has a lower percentage of solid contaminants than originally present in the liquid suspension or slurry.

The separation processes described herein are applicable to "suspensions" as well as to "slurries" of solid particles. These terms are sometimes defined equivalently and sometimes are distinguished based on the need for the input of at least some agitation or energy to maintain homogeneity in the case of a "slurry." Because the methods of the present invention, described herein, are applicable broadly to the separation of solid particles from aqueous media, the term "suspension" is interchangeable with "slurry" (and vice versa) in the present specification and appended claims.

The treatment step may involve adding a sufficient amount of the amine-aldehyde resin to electronically interact with and either coagulate or flocculate the solid contaminants into larger agglomerates. The necessary amount can be readily determined depending on a number of variables (e.g., the type and concentration of contaminant), as is readily appreciated by those having skill in the art. In other embodiments, the treatment may involve contacting the liquid suspension continuously with a fixed bed of the resin, in solid form.

During or after the treatment of a liquid suspension with the amine-aldehyde resin, the coagulated or flocculated solid contaminant (which may now be, for example, in the form of larger, agglomerated particles or flocs) is removed. Removal may be effected by flotation (with or without the use of rising air bubbles as described previously with respect to froth flotation) or sedimentation. The optimal approach for removal will depend on the relative density of the flocs and other factors. Increasing the quantity of resin that is used to treat the suspension can in some cases increase the tendency of the flocs to float rather than settle. Filtration or straining may also be an effective means of removing the agglomerated flocs of solid particulates, regardless of whether they reside in a surface layer or in a sediment.

Examples of liquid suspensions that may be purified according to the present invention include oil and gas well drilling fluids, which accumulate solid particles of rock (or drill cuttings) in the normal course of their use. These drilling fluids (often referred to as "drilling muds") are important in the drilling process for several reasons, including transporting these drill cuttings from the drilling area to the surface, where their removal allows the drilling mud to be recirculated. The addition of amine-aldehyde resins of the present invention to oil well drilling fluids, and especially water-based (i.e., aqueous) drilling fluids, effectively coagulates or flocculates solid particle contaminants into larger clumps into larger clumps (or flocs), thereby facilitating their separation by settling or flotation. The resins of the present invention may be used in conjunction with known flocculants for this application such as polyacrylamides or hydrocolloidal polysaccharides. Often, in the case of suspensions of water-based oil or gas well drilling fluids, the separation of the solid contaminants is sufficient to provide a purified drilling fluid for reuse in drilling operations.

Other aqueous suspensions of practical interest include the clay-containing aqueous suspensions or brines, which accompany ore refinement processes, including those described above. The production of purified phosphate from mined calcium phosphate rock, for example, generally relies on multiple separations of solid particulates from aqueous media, whereby such separations can be improved using the resin of the present invention. In the overall process, calcium phosphate is mined from deposits at an average depth of about 25 feet below ground level. The phosphate rock is initially recovered in a matrix containing sand and clay impurities. The matrix is first mixed with water to form a slurry, which, typically after mechanical agitation, is screened to retain phosphate pebbles and to allow fine clay particles to pass through as a clay slurry effluent with large amounts of water.

These clay-containing effluents generally have high flow rates and typically carry less than 10% solids by weight and more often contain only from about 1% to about 5% solids by weight. The dewatering (e.g., by settling or filtration) of this waste clay, which allows for recycle of the water, poses a significant challenge for reclamation. The time required to dewater the clay, however, can be decreased through treatment of the clay slurry effluent, obtained in the production of phosphate, with the amine-aldehyde resin of the present invention. Reduction in the clay settling time allows for efficient re-use of the purified water, obtained from clay dewatering, in the phosphate production operation. In one embodiment of the purification method, wherein the liquid suspension is a clay-containing effluent slurry from a phosphate production facility, the purified liquid contains less than about 1% solids by weight after a settling or dewatering time of less than about 1 month.

In addition to the phosphate pebbles that are retained by screening and the clay slurry effluent described above, a mixture of sand and finer particles of phosphate is also obtained in the initial processing of the mined phosphate matrix. The sand and phosphate in this stream are separated by froth flotation which, as described earlier, can be improved using the amine-aldehyde resin of the present invention as a depressant for the sand.

In the area of slurry dewatering, another specific application of the resin is in the filtration of coal from water-containing slurries. The dewatering of coal is important commercially, since the BTU value and hence the quality of the coal decreases with increasing water content. In one embodiment of the invention, therefore, the amine-aldehyde resin is used to treat an aqueous coal-containing suspension or slurry prior to dewatering the coal by filtration.

As used herein, "beneficiation" broadly refers to any process for purifying and/or upgrading a value material as described herein. In the case of coal ore purification, a number of beneficiation operations are conventionally used in an effort to improve the quality of coal that is burned, for example, in electricity-generating power plants. As discussed previously, for example, such quality improvement processes address environmental concerns that have resulted in lower tolerances for metallic contaminants such as mercury and arsenic, as well as nitrogen- and sulfur-containing compounds that lead to acid rain. Froth flotation, as discussed previously, affords one method for the purification of a coal ore via treatment of an aqueous slurry of the ore with the amine-aldehyde resin of the present invention. Treatment can alternatively occur prior to or during conventional coal size or density classification operations to facilitate the reduction in the amount(s) of one or more of the mercury, nitrogen, sulfur, silicon, ash, and pyrite impurities in the purified coal, wherein these impurities are measured on a volatile free weight basis and as described previously. The amine-aldehyde resin can also be used in conjunction with size or density classification operations to reduce moisture and/or increase the fuel value of the purified coal (e.g., measured in BTU/lb). Preferably, the reduction of the amount(s) of one or more (e.g., two or more, or all) of the impurities described above, in the purified coal recovered in the size or density classification operation is/are preferably less than the corresponding reference amount(s) in a purified reference coal recovered in the same size or density classification operation, but without using the amine-aldehyde resin.

In general, the reduction of one of the impurities noted above in the purified coal, results in a corresponding reduction in the amount of one or more other undesired impurities. For example, a reduction in pyrite generally leads to a reduction in mercury and other inorganic materials such as silicon-containing ash. In one embodiment, the use of one or more size or density classification operations in conjunction with the amine-aldehyde resin results in a reduction in amounts of all the impurities noted above.

Suitable conventional size or density classification operations include cyclone separation, heavy medium (or heavy media or dense medium) separation, filtration, and screening, any of which may be used in combination (e.g., serially or in parallel) with each other or with froth flotation. Generally, these operations precede froth flotation to provide, in combination with froth flotation, an upgraded or purified coal meeting the various specifications (e.g., nitrogen and sulfur levels) required for combustion in electricity-generating power plants. For example, water-only or clarifying cyclone operations process a feed stream of a raw coal ore slurry, which is fed tangentially under pressure into a cyclone. Centrifugal force moves heavier material to the cyclone wall, where it is subsequently typically transported to the underflow at the apex (or spigot). Lighter coal particles that are disposed toward the center of the cyclone are removed via a pipe (or vortex finder) to the overflow. The targeted density at which light and heavy particles are separated may be adjusted by varying pressure, vortex finder length, and/or apex diameter. Such water-only or clarifying cyclones typically treat material in the 0.5-1 mm size range and may involve two ore more stages of separation to improve separation efficiency.

Heavy medium separation uses a dense liquid medium (e.g., magnetite at a specified magnetite/water ratio) to float particles (e.g., coal) having a density below that of the medium and depress particles (e.g., sand or rock) having a density above that of the medium. Heavy medium separation may be employed in a simple deep or shallow "bath" configuration or may be included as part of a cyclone separation operation to enhance the gravitational separation forces with centrifugal forces. Often, one or more stages of a clarifying cyclone separation operation are followed by one or more stages of heavy medium cyclone separation and one or more screening steps to yield an appropriately sized and purified (e.g., a pre-conditioned or pre-treated) coal feedstock for subsequent froth flotation.

Another significant application of the amine-aldehyde resin of the present invention is in the area of sewage treatment, which refers to various processes that are undertaken to remove contaminants from industrial and municipal waste water. Such processes thereby purify sewage to provide both purified water that is suitable for disposal into the environment (e.g., rivers, streams, and oceans) as well as a sludge. Sewage refers to any type of water-containing wastes which are normally collected in sewer systems and conveyed to treatment facilities. Sewage therefore includes municipal wastes from toilets (sometimes referred to as "foul waste") and basins, baths, showers, and kitchens (sometimes referred to as "sullage water"). Sewage also includes industrial and commercial waste water, (sometimes referred to as "trade waste"), as well as stormwater runoff from hard-standing areas such as roofs and streets.

The conventional treatment of sewage often involves preliminary, primary, and secondary treatment steps. Preliminary treatment refers to the filtration or screening of large solids such as wood, paper, rags, etc., as well as coarse sand and grit, which would normally damage pumps. The subsequent primary treatment is then employed to separate most of the remaining solids by settling in large tanks, where a solids-rich sludge is recovered from the bottom of these tanks and treated further. A purified water is also recovered and normally subjected to secondary treatment by biological processes.

Thus, in one embodiment of the present invention, the settling or sedimentation of sewage water may comprise treating the sewage with the amine-aldehyde resin of the present invention. This treatment may be used to improve the settling operation (either batch or continuous), for example, by decreasing the residence time required to effect a given separation (e.g., based on the purity of the purified water and/or the percent recovery of solids in the sludge). Otherwise, the improvement may be manifested in the generation of a higher purity of the purified water and/or a higher recovery of solids in the sludge, for a given settling time.

After treatment of sewage with the amine-aldehyde resin of the present invention and removing a purified water stream by sedimentation, it is also possible for the amine-aldehyde resin to be subsequently used for, or introduced into, secondary treatment processes to further purify the water. Secondary treatment normally relies on the action of naturally occurring microorganisms to break down organic material. In particular, aerobic biological processes substantially degrade the biological content of the purified water recovered from primary treatment. The microorganisms (e.g., bacteria and protozoa) consume biodegradable soluble organic contaminants (e.g., sugars, fats, and other organic molecules) and bind much of the less soluble fractions into flocs, thereby further facilitating the removal of organic material.

Secondary treatment relies on "feeding" the aerobic microorganism's oxygen and other nutrients which allow them to survive and consume organic contaminants. Advantageously, the amine-aldehyde resin of the present invention, which contains nitrogen, can serve as a "food" source for microorganisms involved in secondary treatment, as well as potentially an additional flocculent for organic materials. In one embodiment of the invention, therefore, the sewage purification method further comprises, after removing purified water (in the primary treatment step) by sedimentation, further treating the purified water in the presence of microorganisms and the amine-aldehyde resin, and optionally with an additional amount of amine-aldehyde resin, to reduce the biochemical oxygen demand (BOD) of the purified water. As is understood in the art, the BOD is an important measure of water quality and represents the oxygen needed, in mg/l (or ppm by weight) by microorganisms to oxidize organic impurities over 5 days. The BOD of the purified water after treatment with microorganisms and the amine-aldehyde resin, is generally less than 10 ppm, typically less than 5 ppm, and often less than 1 ppm.

The amine-aldehyde resin of the present invention may also be applied to the purification of pulp and paper mill effluents. These aqueous waste streams normally contain solid contaminants in the form of cellulosic materials (e.g., waste paper; bark or other wood elements, such as wood flakes, wood strands, wood fibers, or wood particles; or plant fibers such as wheat straw fibers, rice fibers, switchgrass fibers, soybean stalk fibers, bagasse fibers, or cornstalk fibers; and mixtures of these contaminants). In accordance with the method of the present invention, the effluent stream comprising a cellulosic solid contaminant is treated with the amine-aldehyde resin of the present invention, such that purified water may be removed via sedimentation, flotation, or filtration.

In the separation of bitumen from sand and/or clay impurities as described previously, various separation steps may be employed either before or after froth flotation of the bitumen-containing slurry. These steps can include screening, filtration, and sedimentation, any of which may benefit from treatment of the oil sand slurry with the amine-aldehyde resin of the present invention, followed by removal of a portion of the sand and/or clay contaminants in a contaminant-rich fraction (e.g., a bottoms fraction) or by removal of a purified bitumen fraction. As described above with respect to phosphate ore processing water effluents, which generally contain solid clay particles, the treating step can comprise flocculating these contaminants to facilitate their removal (e.g., by filtration). Waste water effluents from bitumen processing facilities will likewise contain sand and/or clay impurities and therefore benefit from treatment with the amine-aldehyde resin of the present invention to dewater them and/or remove at least a portion of these solid impurities in a contaminant-rich faction. A particular process stream of interest that is generated during bitumen extraction is known as the "mature fine tails," which is an aqueous suspension of fine solid particulates that can benefit from dewatering. Often, in the case of sand and/or clay containing suspensions from a bitumen production facility, separation of the solid contaminants is sufficient to allow the recovery or removal of a purified liquid or water stream that can be recycled to the bitumen process.

The treatment of various intermediate streams and effluents in bitumen production processes with the resin of the present invention is not limited only to those processes that rely at least partly on froth flotation of an aqueous bitumen-containing slurry. As is readily appreciated by those of skill in the art, other techniques (e.g., centrifugation via the "Syncrude Process") for bitumen purification will generate aqueous intermediate and byproduct streams from which solid contaminant removal is desirable.

The amine-aldehyde resins of the present invention can be employed in the removal of suspended solid particulates, such as sand and clay, in the purification of water, and particularly for the purpose of rendering it potable. Moreover, resins of the present invention have the additional ability to complex metallic cations (e.g., lead and mercury cations) allowing these unwanted contaminants to be removed in conjunction with solid particulates. Therefore, resins of the present invention can be used to effectively treat impure water having both solid particulate contaminants as well as metallic cation contaminants. Without being bound by theory, it is believed that electronegative moieties, such as the carbonyl oxygen atom on the urea-formaldehyde resin polymer backbone, complex with undesired cations to facilitate their removal. Generally, this complexation occurs at a pH of the water that is greater than about 5 and typically in the range from about 7 to about 9.

Another possible mechanism for the removal of metallic cations is based on their association with negatively charged solid particulates. Flocculation and removal of these particulates will therefore also cause, at least to some extent, the removal of metallic cations. Regardless of the mechanism, in one embodiment, the treatment and removal of both of these contaminants can be carried out according to the present invention to yield potable water.

The removal of metallic cations may represent the predominant or even the sole means of water purification that is effected by the amine-aldehyde resin, for example when the water to be purified contains little or no solid particulates. Solid forms of the resin may be used to remove cations in a continuous process whereby the impure water containing metallic cations is continuously passed through a fixed bed of the resin. Alternatively, soluble forms of the resin, generally having a lower molecular weight, may be added to the impure water in order to treat it. The complexed cations in this case can be removed, for example, by ultrafiltration through a porous membrane (e.g, polysulfone) having a molecular weight cutoff that is less than the molecular weight of the resin. The water purification methods described herein may also be used in conjunction with known methods including reverse osmosis, UV irradiation, etc.

To increase the effectiveness of resins of the present invention in complexing with metallic cations, it may be desirable to modify this amine-aldehyde resin with one or more anionic functional groups. Such modifications are known in the art and can involve the reaction of the resin to incorporate the desired functional group (e.g., by sulfonation with sodium metabisulfite). Alternatively, the modification is achieved during preparation of the resin (e.g., during condensation) by incorporating an anionic co-monomer, such as sodium acrylate, into the amine-aldehyde resin. Representative functionalities with which the resin, including a urea-formaldehyde resin, may be modified include the anionic functional groups bisulfite, acrylate, acetate, carbonate, azide, amide, etc. Procedures for modifying the resin with additional functionalities are known to those having skill in the art. The incorporation of anionic functional groups into the resin is also often employed in separations involving the purification of slurries containing solid clay particles (e.g., by froth flotation, flocculation, etc.), including the purification of kaolin clay ore. Without being bound by theory, sulfonation of the resin or the incorporation of other anionic functional groups can also increase hydrogen bonding between the resin and the surrounding aqueous phase to inhibit condensation of the resin or otherwise improve its stability.

As described above, therefore, the present invention, in one embodiment, is a method for purifying water containing a metallic cation by treating the water with an amine-aldehyde resin as described herein and which may be modified with an anionic group. Removal of at least a portion of the metallic cations may be effected by retaining them on a fixed bed of the resin or otherwise by filtering them out. In the latter case, removal by filtration such as membrane filtration is made possible by the association of the metallic cations either directly with the amine-aldehyde resin or indirectly with the resin via solid particulates, for which the resin has affinity. In the case of indirect association, as described earlier, flocculation of the solid particulates will also necessarily agglomerate at least a portion of the metallic cations, which may therefore be removed by flotation or sedimentation of these particulates.

The amine-aldehyde resin of the present invention is therefore advantageously used to treat water for the removal of metallic cations such as arsenic, lead, cadmium, copper, and mercury that are known to pose health risks when ingested. These cations thus include $As^{+5}$, $Pb^{+2}$, $Cd^{+2}$, $Cu^{+2}$, $Hg^{+2}$, $Zn^{+2}$, $Fe^{+2}$, and mixtures thereof. Generally, a degree of removal is effected such that the purified water, after treatment, is essentially free of one or more of the above metallic cations. By "essentially free" is meant that the concentration(s) of one or more metallic cation(s) of interest is/are reduced to concentration(s) at or below those considered safe (e.g., by a regulatory agency such as the U.S. Environmental Protection Agency). Therefore, in various embodiments, the purified water will contain at most about 10 ppb of $As^{+5}$, at most about 15 ppb of $Pb^{+2}$, at most about 5 ppb of $Cd^{+2}$, at most about 1.3 ppm of $Cu^{+2}$, and/or at most about 2 ppb of $Hg^{+2}$. That is, generally at least one, typically at least two, and often all, of the above-mentioned cations are at or below these threshold concentration levels in the purified water.

In any of the applications described herein, it is possible to stabilize the amine-aldehyde resin of the present invention by reaction with an alcohol (i.e., etherification). Without being bound by theory, it is believed that etherification of pendant alkylol functionalities can inhibit further condensation of the amine-aldehyde resin (e.g., condensation of the urea-formaldehyde resin with itself). This can ultimately hinder or prevent the precipitation of the resin during long term storage, such that, relative to their corresponding non-etherified resins, the etherified resins can have increased molecular weight without an accompanying loss in stability.

Etherification thus involves reacting the amine-aldehyde adducts or condensates, or even the resins, prepared as described above, with an alcohol. In one embodiment, a urea-formaldehyde resin is etherified with an alcohol having from 1 to 8 carbon atoms. Representative alcohols for use in the etherification include methanol (e.g., to effect methylation), ethanol, n-propanol, isopropanol, n-butanol, and isobutanol. In exemplary preparations of etherified resins, the amine-aldehyde adduct or condensate reaction product is heated to a temperature from about 70° C. to about 120° C. in the presence of an alcohol until the etherification is complete. An acid such as sulfuric acid, phosphoric acid, formic acid, acetic acid, nitric acid, alum, iron chloride, and other acids may be added before or during the reaction with alcohol. Often, sulfuric acid or phosphoric acid is employed.

All references cited in this specification, including without limitation, all U.S., international, and foreign patents and patent applications, as well as all abstracts and papers (e.g., journal articles, periodicals, etc.), are hereby incorporated by reference into this specification in their entireties. The discussion of the references herein is intended merely to summarize the assertions made by their authors and no admission is made that any reference constitutes prior art. Applicants reserve the right to challenge the accuracy and pertinence of the cited references. In view of the above, it will be seen that several advantages of the invention are achieved and other advantageous results obtained.

As various changes could be made in the above methods and compositions without departing from the scope of the invention, it is intended that all matter contained in this application, including all theoretical mechanisms and/or modes of interaction described above, shall be interpreted as illustrative only and not limiting in any way the scope of the appended claims.

The following examples are set forth as representative of the present invention. These examples are not to be construed as limiting the scope of the invention as these and other equivalent embodiments will be apparent in view of the present disclosure and appended claims.

EXAMPLE 1

Various urea-formaldehyde resins were prepared as low molecular weight condensate resins, initially under alkaline conditions to form methylolated urea adducts, and then under acidic conditions to form the condensate. The condensation reaction was stopped by raising the pH of the condensation reaction mixture. Other preparation conditions were as described above. These resins are identified in Table 1 below with respect to their molecular weight (Mol. Wt.) in grams/mole and their approximate normalized weight percentages of free urea, cyclic urea species (cyclic urea), mono-methylolated urea (Mono), and combined di-/tri-methylolated urea (Di/Tri). In each case, the resins were in a solution having a resin solids content of 45-70%, a viscosity of 500 cps or less, and a free formaldehyde content of less than 5% by weight.

TABLE 1

Urea-Formaldehyde Resins

| ID | Mol. Wt.[a] | Free Urea | Cyclic Urea | Mono | Di/Tri |
| --- | --- | --- | --- | --- | --- |
| Resin A | 406 | 8 | 39 | 30 | 23 |
| Resin B* | 997 | 5 | 50 | 22 | 23 |
| Resin C and C'** | 500 | 6 | 46 | 25 | 23 |
| Resin D and D'*** | 131 | 43 | 21 | 30 | 6 |
| Resin E | 578 | 0 | 18 | 10 | 72 |
| Resin F | 1158 | 1 | 44 | 11 | 44 |
| Resin G | 619 | 0 | 26 | 3 | 71 |

*Resin B is a very stable urea-formaldehyde resin, having a high cyclic urea content. This resin is described in U.S. Pat. No. 6,114,491.
**Resin C' was formed by adding 2% by weight of diethylenetriamine and 2% by weight dicyandiamide to the mixture of urea and formaldehyde during resin preparation.
***Resin D' was formed by adding 0.75% by weight cyclic phosphate ester to the mixture of urea and formaldehyde during resin preparation. The resin was a low molecular weight formulation with a high content of free urea, essentially no free formaldehyde, and a high content of non-volatiles (about 70% solids).
[a]Number average molecular weight determined using gel permeation chromatography (GPC) with appropriately sized PLgel ™ columns (Polymer Laboratories, Inc., Amherst, MA, USA), 0.5% glacial acetic acid/tetrahydrofuran mobile phase at 1500 psi, and polystyrene, phenol, and bisphenol-A calibration standards.

EXAMPLE 2

Samples of urea-formaldehyde (UF) resins similar to those described in Example 1 were tested for their ability to settle graphite and bentonite, suspended in aqueous media. In four separate experiments, 4.4 gram samples of particulate graphite (two experiments) and particulate bentonite (two experiments) were suspended in 220 grams of water in a jar, and the jars were in each case shaken vigorously for two minutes to suspend the solid particles. However, 22 grams of UF resin were added to one of the jars containing the graphite and also to one of the jars containing bentonite prior to shaking. The four jars were left to stand for 24 hours and observed to evaluate the effect of the added UF resin on the solid-liquid separation via settling. The four jars were photographed and are shown in FIG. 1.

As is apparent from FIG. 1, in the leftmost jar, to which UF resin was added, the graphite was settled on the bottom of the jar. No graphite was visible at the air-water interface or on the jar surface. The UF resin used in this case also settled with the graphite. In contrast, the second jar from the left, to which no resin was added, had a significant amount of the graphite clinging to its surface. Much of the graphite also remained at the air-water interface. The use of UF resin, therefore, greatly facilitated the separation of graphite from water via settling.

Likewise, the bentonite was settled on the bottom of the third jar from the left, to which UF resin was added. The opaqueness of the liquid phase resulted from the use, in this case, of a water-dispersible UF resin. In contrast, the rightmost jar, to which no resin was added, had a significant amount of solid bentonite clinging to its surface and remaining at the air-water interface. Again, the use of UF resin significantly improved the separation of bentonite via settling.

EXAMPLE 3

A urea-formaldehyde (UF) resin similar to those described in Example 1, was tested for its ability to reduce the dewatering time, by filtration, of various solid contaminants (i.e., montmorillonite, bentonite, and graphite) suspended in aqueous slurries. In each experiment, a 25 gram sample of solid contaminant was uniformly slurried with 100 grams of 0.01 molar $KNO_3$. The pH of the slurry was measured. The slurry was then subjected to vacuum filtration using a standard 12.7 cm diameter Buchner funnel apparatus and 11.0 cm diameter Whatman qualitative #1 filter paper. Except for the first experiment using montmorillonite, the dewatering time in each case was the time required to recover 100 ml of filtrate through the filter paper. In the case of montmorillonite dewatering, the solid used was so fine that an excess of 5 minutes would have been required to remove 100 ml of filtrate. Therefore, the relative dewatering time was based on the amount of filtrate removed in 5 minutes.

For each solid contaminant tested, a control experiment as run, followed by an identical experiment, differing only in (1) the addition of 0.5-1 grams of UF resin to the slurry and (2) mixing of the slurry for one additional minute, after a uniform slurry was obtained upon stirring. Results are shown below in Table 2.

TABLE 2

Dewatering Time for Aqueous Slurries
(25 grams Solid Contaminant in 100 grams 0.01 M $KNO_3$)

| Solid | Control | Control + 0.5-1 grams UF Resin |
|---|---|---|
| Montmorillonite | 11.8 grams* | 14.2 grams* |
| (slurry pH) | (8.5) | (8.6) |
| Bentonite | 138 seconds** | 37 seconds*** |
| (slurry pH) | (8.0) | (8.3) |
| Graphite | 9.4† | 6.1†† |
| (slurry pH) | (4.4) | (4.3) |

*amount of water removed over 5 minutes
**average of two experiments (139 seconds/137 seconds)
***average of two experiments (35 seconds/38 seconds)
†average of two experiments (9.3 seconds/9.5 seconds)
††average of two experiments (5.9 seconds/6.2 seconds)

The above results demonstrate the ability of UF resins, even when used in small quantities, to significantly decrease the dewatering time for a number of solid particles.

EXAMPLE 4

The following reactants were used to prepare a urea-formaldehyde resin.

TABLE 3

| | g |
|---|---|
| UFC85 | 2334.7 |
| formalin solution, 50% $CH_2O$ | 200.3 |
| fresh water | 113.8 |
| TEA, 85% (first charge) | 16.0 |
| $NH_4OH$, 28% | 512.3 |
| urea (first charge) | 256.1 |
| $H_2SO_4$, 7% | 135 |
| urea (second charge) | 470.6 |
| TEA #2 (second charge) | 8.7 |

A resin was prepared by charging UFC 85 (25% urea, 60% formaldehyde and 15% water), formalin and fresh water into a reactor and heated with agitation to 40° C. TEA and $NH_4$ OH were then added and held for 5 minutes. The first urea charge was added with continued cooling at 40° C. The reaction mixture was then heated to 95° C. over the course of 30 minutes and held at 95° C. for 15 minutes. The pH was monitored and adjusted to 5.0 to 5.3 by the addition of from 10 to 25 g of $H_2SO_4$. A total of 135 g being added over the course of one hour. The reaction mixture was cooled to 80° C. The second urea charge was added over the course of 5 minutes, heated to 85° C. and maintained at this temperature for a period of one hour after which the second charge of TEA was added and the temperature cooled to 25° C. The pH was adjusted to a pH of 7.4-7.6 using a 5.5 g of 25% NaOH. The initial amount of formaldehyde was decreased from 3.60 moles to 2.30 moles per mole of urea in the final product. The amount of ammonia being 0.40 mole per mole of urea. The fresh free formaldehyde level was 0.12% at 0° C. After 24 hours free formaldehyde levels were 0.0%. Free formaldehyde levels were run using the sodium sulfite ice method.

EXAMPLE 5

The following reactants were used to prepare a urea-formaldehyde resin.

TABLE 4

| | g |
|---|---|
| UFC 85 | 1004.6 |
| formalin solution, 50% $CH_2O$ | 1767.6 |
| fresh water | 22.1 |
| TEA | 18.7 |
| $NH_4OH$, 28% | 367.1 |
| urea (first charge) | 686.3 |
| $H_2SO_4$, 7% | 83.6 |
| urea (second charge) | 155.9 |
| NaOH, 25% | 11.0 |
| urea (third charge) | 155.9 |
| urea (fourth charge) | 73.8 |

A resin was prepared by charging UFC 85, formalin and fresh water into a reactor and heated with agitation to 45° C. TEA and $NH_4$ OH are added and held for 5 minutes. The reaction was then cooled to 50° C. and the first urea charge added. The reaction mixture was then heated to 95° C. over the course of 30 minutes and held at 95° C. for 15 minutes, pH was monitored and adjusted to 5.1 by the addition of sulfuric acid. The reaction mixture was cooled to 85° C. and the second urea charge was added over the course of 5 minutes. The pH was adjusted to 7.0-7.4 by the addition of NaOH. A third urea charge was added and held for 20 minutes to scavenge free formaldehyde. The reaction medium was cooled to 40° C. A fourth charge of urea was made and the resin cooled to 25° C.

The ammonia to urea ratio was 0.30. The formaldehyde to urea ratio went from 3.00 following the first urea charge, to 2.25 following the second urea charge, to 2.00 following the third charge of urea, to 1.90 following the fourth charge. Fresh free formaldehyde level was 0.69%. Twenty-four hour free-formaldehyde levels were <0.5 ppm. Free formaldehyde levels were determined using the sodium sulfite ice method.

EXAMPLE 6

140 g of $FeSO_4$ was mixed with 25.2 g urea-formaldehyde resin of Example 3 of the invention and 2.3 g of peat and compressed under pressure. Due to the presence of the acid salt, curing of the resin occurs at ambient temperature. Using this laboratory prepared mix, without additional water, as a binder for ferrous sulfate briquettes, the mixture became stiff to firm in 15 minutes.

Small amounts of water can be added, about 7% based on the ferrous sulfate, if desired, to increase the pot life of the mix. If additional pot life is needed, polymer formulation can be modified to adjust the setting cycle of the polymer.

EXAMPLE 7

The following reactants were used to prepare a urea-formaldehyde resin.

TABLE 5

| Reactant | moles |
| --- | --- |
| formalin solution, 50% $CH_2O$ | 14.5 |
| EDA | 0.3 |
| Urea (first charge) | 12.1 |
| $NH_4OH$, 28% | 6.1 |
| UFC 85: | |
| Water | 14.4 |
| HCHO | 34.5 |
| UREA | 7.2 |
| Urea (second charge0 | 3.5 |
| Alum 50% | 0.2 |
| NaOH 25% | 0.02 |
| latent catalyst | 0.02 |
| Water | 1.6 |

A resin was prepared by charging the 50% formalin, EDA (ethylenediamine) and urea into a reactor and heating the mixture to 45° C. to dissolve the urea. Then $NH_4OH$ was added which caused the mixture to exotherm to a temperature of 83° C. The reaction mixture was then heated further to 95° C. and maintained at that temperature for 90 minutes. A cyclic polymer was formed in this initial phase of the chemical reaction. (The triazone concentration can be over 50% of the total polymer mix at this time of the synthesis depending on the molar ratios of the ingredients.) The pH of the mixture was monitored and maintained between 8.7 and 9.3 by adding 25% NaOH as needed at spaced intervals. A total of 0.4 moles were added. The reaction mixture then was cooled to 85° C. UFC 85 (25% urea, 60% formaldehyde and 15% water) and a second charge of urea then were added to the reaction mixture. The temperature was thereafter maintained at 85° C. for 10 minutes. The pH was adjusted to from about 6.2 to 6.4 by adding a total of 0.2 mole of alum in increments over a course of 25 minutes. The reaction mixture was cooled to 80° C., and after 15 minutes, further cooled to 75° C. After 7 minutes, the reaction mixture was cooled to 55° C., 26.9 g 25% NaOH was added, and then the mixture was further cooled to 35° C. A latent catalyst was added and the reaction mixture was cooled to 25° C. The pH was finally adjusted to 7.6 to 8.2 with 25% NaOH.

The fresh free formaldehyde level of the so-produced resin was 0.59%. After 24 hours the free formaldehyde level had dropped to 0.15%. The resin's viscosity was 573 cp.

EXAMPLE 8

About 1.2 moles formaldehyde (50% solution), about 1.0 moles urea, and about 0.5 moles ammonia as 28% ammonium hydroxide were added to a glass reactor and heated to 95° C. The pH was maintained at 8.3 to 8.6 for 90 minutes with 25% sodium hydroxide. Then about 2.4 moles of formaldehyde and about 0.9 moles of urea were added as UFC 85 and urea. The pH of the solution was adjusted to 4.9 to 5.1 with 50% aluminum sulfate and reacted to a Gardner-Holdt viscosity of "K". The polymer solution was then neutralized to pH 7.4 with 25% sodium hydroxide and cooled to 25° C. The final Brookfield viscosity was 200 cps with a free formaldehyde level of about 0.5%.

EXAMPLE 9

About 1.2 moles formaldehyde (50% solution), about 0.0003 moles triethanolamine, about 1.0 moles urea, and about 0.5 moles ammonia as 28% ammonium hydroxide were added to a glass reactor and heated to 95° C. The pH was maintained at 8.3 to 9.1 for 90 minutes with 25% sodium hydroxide. Then about 2.4 moles of formaldehyde and about 0.9 moles of urea were added as UFC 85 and urea. The temperature was adjusted to 90° C. and the pH of the solution was adjusted to 5.1 to 5.3 with 50% aluminum sulfate and reacted to a Gardner-Holdt viscosity of "K". The polymer solution was then adjusted to a pH of 6.8 with 25% sodium hydroxide and cooled to 25° C. The final Brookfield viscosity was 245 cps with a free formaldehyde level of about 0.7%.

EXAMPLE 10

Ammonia Modified Aldehyde Condensation Polymer

An ammonia-modified aldehyde condensation polymer was prepared as follows. Where pH adjustment is noted in the following, a sodium hydroxide solution (25% NaOH in water) and/or a sulfuric acid solution (7% $H_2SO_4$ in water) was used as necessary. The following ingredients were placed in a kettle reactor in about the following amounts:

2.5 parts water 58.6 parts formaldehyde solution (52% formaldehyde in water), the reactor was equipped with a temperature controller, an agitator, and heating and cooling coils. As shown in Example 2 infra., urea-formaldehyde concentrates are preferably utilized. Such concentrates are commercially available and preferred from an economic standpoint as less water needs to be added and removed. The pH was adjusted to about 4.7-4.9. Then about 8.8 parts of ammonium hydroxide solution (28% $NH_4OH$ in water) was charged in less than about 25 minutes. Heat was applied to obtain a temperature of about 75° C. and held at that temperature for about 5 minutes. The pH was adjusted to at least about 8.0. The reactor contents were then cooled to less than about 55° C. About 29 parts of urea prill were added thereto while continuing to cool and maintaining a temperature between about 20° C. and about 35° C. Urea pellets or shot may also be used. While mixing to dissolve the urea, the reactants were heated to about 40° C. The pH was adjusted to at least 8.8. The reactants were then heated to about 97° C. over about a 30 minute period, while maintaining a pH of at least about 6.6. The temperature was then held at this level for about 15 minutes maintaining a pH of at least about 6.0. The reactor contents were then rapidly cooled to about 85° C. and held there until a Gardner-Holdt viscosity of "A" was achieved (about 45 minutes). Upon achieving an "A" viscosity, the reactor contents were cooled to about 65° C. and held at that level until a viscosity of "D" was achieved (about 20 minutes). During these two time periods, the pH was maintained at a pH of at least about 4.7. Thereafter, the pH was adjusted to a pH ranging from about 7.7 to about 8.0, while adjusting and maintaining the temperature to about 60° C. A vacuum was applied to the reactor and about 11% of the in-kettle batch weight was distilled as rapidly as possible. The viscosity was about "KL". After cooling to about 25° C., about 1 part triethylamine sulfate (as a latent catalyst; also known as N,N-diethylethane amine sulfate) was added to the reactor contents. After about 10 minutes of mixing, the pH was adjusted to about 8.0. The final product had a refractive index at 25° C. of about 1.45.

EXAMPLE 11

Preparation of Cyclic Urea Prepolymer a) A cyclic urea prepolymer having a mole ratio of 1.0:2.0:0.5, urea:formaldehyde:ammonia (U:F:A), was prepared by charging a reaction vessel with formaldehyde, ammonia, and urea while maintaining the temperature below about 65° C. Once all the reactants were in the reaction vessel, the resulting solution was heated to about 90° C., for about 1 hour until the reaction is complete. Once the reaction was complete, the solution was cooled to room temperature. $C^{13}$-NMR indicated approximately 42.1% of the urea was contained in the triazone ring structure, 28.5% of the urea was di/tri-substituted, 24.5% of the urea was mono-substituted, and 4.9% of the urea was free.

b) A second cyclic urea prepolymer was prepared in the same manner as a) except for the mole ratio of 1.0:1.2:0.5. $C^{13}$-NMR indicated approximately 25.7% of the urea was contained in the triazone ring structure, 7.2% of the urea was di/tri-substituted, 31.9% of the urea was mono-substituted, and 35.2% of the urea was free.

c) A third cyclic urea prepolymer was prepared in the same manner as a) except for the mole ratio of 1:3:1 and it was heated to about 90° C. for 1 hour and then 100° C. for 2 hours. $C^{13}$-NMR indicated approximately 76.0% of the urea was contained in the triazone ring structure, 15.3% of the urea was di/tri-substituted, 8.1% of the urea was mono-substituted, and 0.6% of the urea was free.

d) A fourth cyclic urea prepolymer was prepared in the same manner as a) except for the mole ratio of 1:4:1 and it was heated to about 90° C. for 3 hours and the pH was controlled around 7.5. $C^{13}$-NMR indicated approximately 79.2% of the urea was contained in the triazone ring structure, 17.7% of the urea was di/tri-substituted, 1.6% of the urea was mono-substituted, and 1.5% of the urea was free.

EXAMPLE 12

Preparation of Phenol-Formaldehyde Binders Modified with Cyclic Urea Prepolymer and Evaluation of the Binders for Fiberglass Insulation Applications The following phenol-formaldehyde binders were prepared.

1) a pre-reacted system with a 26% urea extension and a formaldehyde to ammonia mole ratio (F/A) of 1.14,
2) non-pre-reacted system with a 26% urea extension and a formaldehyde to ammonia mole ratio (F/A) of 1.14,
3) a non-prereacted system using the 1.0:1.2:0.5 U:F:A system of example 1b at a 26% fortification level and an F/A of 1.14,
4) a non-prereacted system using the 1.0:2.0:0.5 U:F:A system of example 1a at a 26% fortification level and an F/A of 1.14,
5) a non-prereacted system using the 1.0:1.2:0.5 U:F:A system of example 1a at a 50% fortification level and ammonia to result in an F/A 1.14, and
6) a non-prereacted system using the 1.0:2.0:0.5 U:F:A system of example 1a at a 50% fortification level and ammonia to result in an F/A=1.14.

The composition of the binders are summarized in Table 6.

TABLE 6

| Binder | Grams Resin | Grams premix | Grams 40% urea | Grams Water | Grams 28% NH$_4$OH | Grams 20% (NH$_4$)$_2$SO$_4$ | Grams UFA Resin |
| --- | --- | --- | --- | --- | --- | --- | --- |
| 1 | 0 | 42.0 | 0 | 49.7 | 3.8 | 4.5 | 0 |
| 2 | 29.0 | 0 | 13.0 | 49.7 | 3.8 | 4.5 | 0 |
| 3 | 29.0 | 0 | 0 | 51.8 | 3.8 | 4.5 | 10.9 |
| 4 | 29.0 | 0 | 0 | 52.5 | 3.8 | 4.5 | 10.2 |
| 5 | 19.6 | 0 | 0 | 53.7 | 2.6 | 3.3 | 20.9 |
| 6 | 19.6 | 0 | 0 | 55.0 | 2.6 | 3.3 | 19.6 |

The resin had 7.4% free formaldehyde, 1.0% free phenol, a pH of 8.4 and 51% solids.

The formaldehyde emissions of each binder was tested using the tube furnace method. A premix was prepared by combining 145 g of resin with 65 g of 40% urea. The premix solution was allowed to prereact overnight (16 hours) at room temperature. The binders were prepared as outlined in Table 1. The binder was weighed onto a glass filter paper in a glass sample boat to the nearest 0.1 mg. The sample boat was transferred to the tube furnace and cured at 200° C. for 10 minutes. The air from the tube furnace was sparged through a 1:1 solution of acetonitrile to water. The solution was derivatized using dinitrophenylhydrazine and analyzed on the HPLC using a diode array detector to quantify the formaldehyde hydrazone as percent of binder solids.

Handsheets were prepared by sprinkling the binder onto a glass mat, vacuuming the excess binder off the glass, and curing the sheet in a forced air oven at 205° C. for 1.5 minutes. Dry tensiles were measured by breaking the handsheets in a tensile tester, Hot/wet tensiles were measured by soaking the handsheets in water at 85° C. for 10 minutes and then breaking them in a tensile water while they were still hot and wet. The vent for the oven was fitted with a pipe having a light meter attached. Opacity or visible emissions were determined from either the % transmittance or the % absorbance of light.

The opacity and the formaldehyde emissions results for all of the binders are displayed in Table 7.

TABLE 7

| Binder | Opacity (% Absorbance) Area/gram | % Formaldehyde Emissions | Dry Tensile Strength (psi) | Hot/Wet Tensile Strength (psi) |
|---|---|---|---|---|
| 1 | 0.356 | 1.55 | 94.6 | 62.7 |
| 2 | 0.998 | 1.08 | 81.3 | 52.9 |
| 3 | 0.453 | 0.95 | 93.1 | 60.9 |
| 4 | 0.394 | 0.96 | 94.9 | 61.5 |
| 5 | 0.471 | 0.73 | 85.5 | 62.2 |
| 6 | 0.147 | 0.74 | 95.5 | 52.2 |

EXAMPLE 13

Preparation of Phenol-Formaldehyde Resins/Adhesives Modified with Cyclic Urea Prepolymer and Use of the Adhesives in Plywood Methylolated cyclic urea pre-polymer was prepared by reacting urea, ammonia and formaldehyde as described earlier, and then reacting further with two moles of formaldehyde per mole of the urea, to produce the methylolated cyclic urea pre-polymer having a 50% solids level.)

A) Resin A: The cyclic urea prepolymer was reacted with a standard phenol-formaldehyde resin during the cook cycle of the phenol-formaldehyde resin. Phenol (1311 g) was combined with 583 g of formaldehyde (50%), 1217 g of water, 500 g of cyclic urea prepolymer, 16 g of pearl starch, 1.5 g defoamer, and 158 g of caustic (50%). The initial loading of phenol and formaldehyde was adjusted to maintain a mole ratio of 0.8 F/P during the first cook stage. The mixture was allowed to exotherm to 79-80° C. with heat. Additional caustic (142 g, 50%) was added and then 1033 g of formaldehyde (50%) was added over 30 minutes. The mixture was allowed to exotherm to 97-98° C. with heat. The mixture was held for 22 minutes before cooling to room temperature. The cyclic urea prepolymer comprised 9.5 wt % of the final resin.

The viscosity of the final resin was 944 cps at 25° C., solids content was 43.6 wt %, percent caustic was 5.9 wt %, gel time was 25.7 minutes, refractive index of 1.4643 and molecular weight was Mn=279 Mw=693 and Mz=1407. The polydispersity was 2.482.

Resin A illustrated above can be used in the present invention by itself, or in combination with other resins, such as standard plywood resins, as illustrated in the various mixes below. These same resins and combinations also can be used as adhesives in plywood as follows. A standard plywood resin was used as the control resin and had a viscosity of 1146 cps, solids content of 44 wt %, percent caustic of 5.9 wt %, gel time of 24 minutes, refractive index of 1.4646 and molecular weight by GPC of Mn=318, Mw=948, and Mz=2322.

B) Six adhesive mixes were made. The control adhesive mix contained 1) fresh water at 17.5 wt %, 2) Q-bond corn flour extender at 6.6 wt %, 3) Co-Cob filler (furfural residue made from waste agricultural sources) at 7.6 wt %, 4) soda ash at 0.3 wt %, 5) 50% caustic at 3.0 wt % and 6) phenol-formaldehyde resin at 65 wt %. Only the standard plywood resin formed part of the control adhesive mix. The remaining mixes replaced all or part of the standard plywood control resin with Resin A.

Mix #1 The standard plywood control resin.

Mix #2 50/50 wt. ratio of the standard plywood control resin and Resin A.

Mix #3 100% of Resin A

Mix #4 Mixture of 38 g of Resin A and 743 g of the standard plywood control resin.

Mix #5 Mixture of 75 g of Resin A and 706 g of the standard plywood control resin.

Mix #6 Mixture of 154 g of Resin A and 635 g of the standard plywood control resin.

After the adhesive mixes were made, the cyclic urea pre-polymer content in mixes 4, 5 and 6 was increased. Methylolated cyclic urea pre-polymer (35 g) was added to mix 4, 67 g to mix 5 and 137 g to mix 6. Modifications to the formulation were made for the addition of cyclic urea prepolymer which was not cooked into the resin by adjusting the solids contributed by the PF resin, filler and extenders. Those changes are presented in the Table 8 in terms of total dry solids, total resin solids and PF resin solids.

TABLE 8

| | Mix # | | | | | |
|---|---|---|---|---|---|---|
| | 1 | 2 | 3 | 4 | 5 | 6 |
| Total Dry Solids, % | 42.5 | 42.6 | 42.9 | 42.7 | 42.9 | 43.4 |
| Total Resin Solids, % | 28 | 28.2 | 28.4 | 28.7 | 29.2 | 30.5 |
| Total PF Resin Solids, % | 28 | 26.7 | 25.3 | 27.1 | 26.3 | 24.9 |
| Total Cyclic Urea Solids, % | 0 | 1.5 | 3.1 | 1.6 | 2.9 | 5.6 |
| % Cyclic Urea Solids, Cooked | 0 | 1.5 | 3.1 | 0.2 | 0.3 | 0.5 |
| % Cyclic Urea Solids, Added | 0 | 0 | 0 | 1.4 | 2.6 | 5.1 |
| % Cyclic Urea, 100% Resin Basis | 0 | 5.5 | 10.8 | 5.4 | 9.9 | 18.3 |

The adhesive mixes provided above were applied to southern pine veneers and evaluated as adhesives as described in U.S. Pat. No. 6,114,491, which provides details regarding the testing parameters, percent wood failure, and the effect of cyclic urea prepolymer, and the like.

What is claimed is:

1. A method for purifying a coal ore, comprising:
   a. providing a coal ore comprising coal and one or more soluble or insoluble impurities;
   b. prior to or during a size or a density classification operation, contacting an aqueous slurry of the coal ore with an amine-aldehyde resin, and
   c. separating the purified coal from the aqueous slurry;
   wherein the purified coal has, relative to the coal ore, a reduced amount of mercury, nitrogen, sulfur, silicon, ash, or pyrite, as measured on a volatile free weight basis; and
   wherein the amine-aldehyde resin comprises a urea-formaldehyde resin prepared by:
   mixing formaldehyde, urea, triethanolamine and optionally ammonia reactants at an alkaline pH, heating the mixture to an elevated temperature for a time sufficient to obtain complete methylolation of the urea, the reactants being present in an amount of about 1.50 to 4.0 moles of formaldehyde, about 0.001 to 0.1 mole of triethanolamine, and about 0.0 to 0.5 mole ammonia, per mole of urea; and
   adding acid to lower the pH to within the range of about 4.9 to about 5.2 and adding urea until the molar formaldehyde to urea ratio is within the range of about 1.5:1 to about 2.5:1 and reacting for a time sufficient to reduce free formaldehyde to less than 2%.

2. The method of claim 1, wherein the purified coal has, relative to the coal ore, a reduced amount of mercury, cadmium, lead, arsenic, or any compound thereof, as measured on a volatile free weight basis.

3. The method of claim 1, wherein the purified coal has an amount of mercury, nitrogen, sulfur, silicon, ash, or pyrite, as measured on a volatile free weight basis, that is less than the corresponding amounts in a purified reference coal recovered in the size or density classification operation, in which the aqueous slurry of the reference coal ore has not been contacted with the amine-aldehyde resin.

4. The method of claim 1, wherein the purified coal has, relative to the coal ore, a reduced amount of moisture, an increased BTU value, or both.

5. The method of claim 1, wherein the contacting step further comprises contacting the aqueous slurry of the coal ore in step b. with silica, a silicate, a polysiloxane, a polysaccharide, a polyvinyl alcohol, a polyacrylamide, a flocculant, or any combination thereof.

6. The method of claim 1, wherein the reaction mixture of formaldehyde, urea, triethanolamine and ammonia is heated to a temperature of about 95° C. over a period of 30 minutes and maintained at a temperature of 95° C. for 15 to 20 minutes.

7. The method of claim 1, wherein the amine-aldehyde resin comprises a urea-formaldehyde resin having a number average molecular weight ($M_n$) of greater than about 300 grams/mole.

8. The method of claim 1, wherein the amine-aldehyde resin is further modified with an anionic functional group.

* * * * *